(12) United States Patent
Jaisinghani

(10) Patent No.: US 12,095,271 B2
(45) Date of Patent: Sep. 17, 2024

(54) MULTI-HYBRID POWER GENERATOR SYSTEM AND METHOD

(71) Applicant: SOLAIREX INNOVATIVE RESEARCH INC., Fort Worth, TX (US)

(72) Inventor: Deepak D. Jaisinghani, Lewisville, TX (US)

(73) Assignee: SOLAIREX INNOVATIVE RESEARCH INC, Fort Worth, TX (US)

( * ) Notice: Subject to any disclaimer, the term of this patent is extended or adjusted under 35 U.S.C. 154(b) by 90 days.

(21) Appl. No.: 18/084,842

(22) Filed: Dec. 20, 2022

(65) Prior Publication Data

US 2023/0124330 A1 Apr. 20, 2023

Related U.S. Application Data

(63) Continuation-in-part of application No. 17/871,340, filed on Jul. 22, 2022, now Pat. No. 11,563,328.

(60) Provisional application No. 63/225,029, filed on Jul. 23, 2021.

(51) Int. Cl.
*H02J 3/38* (2006.01)
*B01D 53/26* (2006.01)
*H02J 3/00* (2006.01)
*F24F 13/22* (2006.01)

(52) U.S. Cl.
CPC ............. *H02J 3/381* (2013.01); *B01D 53/26* (2013.01); *H02J 3/007* (2020.01); *F24F 13/222* (2013.01); *H02J 2300/24* (2020.01); *H02J 2300/40* (2020.01); *H02J 2310/12* (2020.01)

(58) Field of Classification Search
CPC ...... H02J 3/38; H02J 3/381; H02J 3/00; H02J 3/007; H02J 2300/40; H02J 2300/24; H02J 2310/12; B01D 53/26; F24F 13/222; F24F 13/22
See application file for complete search history.

(56) References Cited

U.S. PATENT DOCUMENTS 7,129,592 B1 * 10/2006 Yetter ...................... F03G 5/06
290/1 R

* cited by examiner

*Primary Examiner* — Robert L Deberadinis
(74) *Attorney, Agent, or Firm* — Grogan, Tuccillo & Vanderleeden LLP

(57) ABSTRACT

A power generation system includes an extraction device configured to extract moisture from an ambient air surrounding the system, a first tank configured to store the moisture, an electrolyzer configured to receive the moisture and produce hydrogen by performing a chemical process, a second tank configured to store the hydrogen produced by the electrolyzer, a generator system configured to generate electrical power from the hydrogen, and a controller configured to control operation of the extraction device and the electrolyzer.

20 Claims, 10 Drawing Sheets

MULTI-HYBRID POWER GENERATOR SYSTEM AND METHOD

CROSS-REFERENCE TO RELATED APPLICATIONS

This application is a continuation-in-part of U.S. patent application Ser. No. 17/871,340, filed on Jul. 22, 2022, which claims priority to U.S. Provisional Application Ser. No. 63/225,029, filed on Jul. 23, 2021, both of which are hereby incorporated by reference herein in their entireties.

FIELD OF THE INVENTION

The present invention relates generally to power systems, and more particularly, to a hydraulic-to-hydrogen-to electric power generation system that employs a multi-hybrid power generator for harvesting and generating power from an interchangeable power source, which can then be used to derive hydrogen from atmosphere for subsequent storage and use, and/or usage in further power production.

BACKGROUND OF THE INVENTION

Today's news is full of media reports of global warming, pollution and other environmental hazards that are impacting the world's inhabitants. Dire predictions are being made about the environmental state of the world and its natural resources. One focal point of these reports is the worldwide generation, use, and consumption of electricity. The generation of electricity involves different kinds of resources such as coal, oil, and natural gas and the processing of the foregoing resources has been identified as a source of deleterious environmental effects that include pollution, acid rain, and greenhouse effects. Given the importance of electricity to everyday comforts including, but not limited to, heating, lighting, communications, transportation, and computing, and to worldwide industries and economies, it is unlikely that worldwide electricity demand will slow in any appreciable manner.

To combat some of the adverse environmental impacts, perceived or otherwise, of electricity generation, scientists, researchers, and industries have recently focused their efforts on alternative and/or renewable energy sources such as solar power, wind power, and tidal power. Wind power is present in certain countries that are erecting large wind farms or wind parks that consist of various numbers of wind turbines spread out over an extensive geographic area that is known to have regular and sustained winds over extended periods of time. The winds turn blades on the turbines that convert the energy of the wind into mechanical power. The mechanical power is then converted to electricity using generators. However, wind power does suffer from potential limitations related to the heavy reliance on location, season, and weather to produce and maintain the necessary winds for the electricity generation. Further, the cost of acquiring the necessary real estate and installation of the plethora of wind turbines thereon can be very high and a barrier to market entry.

Solar energy, another one of the above-identified alternative energy sources, is directed to harvesting energy from the sun that is converted into thermal or electrical energy. Typically, solar energy is harnessed in three main ways: using photovoltaics, solar heating and cooling, and concentrating solar power. Photovoltaics generate electricity directly from sunlight via an electronic process and it is typically associated with powering small and/or medium-sized applications ranging from single devices (e.g., a calculator) to an off-grid home powered by a photovoltaic array. Solar heating and cooling (SHC) and concentrating solar power (CSP) applications use both the heat generated by the sun to provide space or water heating (in the case of SHC systems), or to run traditional electricity-generating turbines (in the case of CSP power plants). This type of renewable energy is typically characterized as either passive solar or active solar and this energy technology can be built as a distributed generation model (e.g., located at or near the point of use) or as a central station model (e.g., a utility-scale solar power plant that is similar to traditional power plants). These energy methods may also store energy that is produced for distribution at some later time (e.g., after the sun sets) using a variety of solar storage technologies. These features have made solar power one of the more desirable alternative renewable energy sources. However, solar power has one significant potential drawback in that the technology in inherently intermittent in nature and may be subject to periods where the source sunlight is unavailable thereby making the solar energy produced therefrom unavailable. As such, this requires that generated solar energy be stored in batteries, thereby increasing the overall costs of pure solar energy systems.

Solar thermal usage is another form of solar energy. This approach is similar to traditional electricity generation in that the energy of the sun drives a power plant, such that electricity is produced indirectly. The solar thermal efforts have focused on matching the efficiencies of traditional power plants that burn fossil fuels, however, this requires complex devices, such as focusing concentrating mirrors to heat oil to very high temperatures. Also, the cost of designing, building, running, and maintaining solar thermal operating plants is very high. In addition to this financial challenge, finding a suitable geographical location for such solar thermal operating plants is a further challenge.

As noted previously, many of the renewable energy technologies require some type of energy storage capacity. Many systems and methods for energy storage have been developed. One such energy storage system pumps water into high elevated reservoirs and then releases the water through hydro-generators. Compressed air energy storage systems compress air with a compressor, and the compressed air is stored in a geological formation (e.g., a cavern, aquifer, etc.) or other structure where it can be drawn upon when energy demands require. Typically, the compressed air mixes with natural gas, combusts and expands through a turbine to generate mechanical power that drives an electric generator to generate electricity. Mechanical gearboxes are used to convert the speed and torque from the power source (e.g., a renewable energy source) to interface with the electrical generator. However, mechanical gearboxes require substantial maintenance and tend to deteriorate faster than the systems they support. Direct drive generators can eliminate the need for these expensive mechanical gearboxes, but the complexity and associated maintenance of direct drive generators make them no less of a cost burden. Such compressed air energy systems are also challenged by geographic constraints and using fixed volume of geological formations, and therefore typically operate at high variable pressures during energy storage and retrieval. This high variable pressure need decreases the efficiency of the compressor and the turbine, which operate at an optimal performance at a single design pressure.

While various energy storage solutions exist, these systems have certain disadvantages that include energy losses during the conversion process, the use of water reservoirs that require large geographical footprints, are expensive to construct, limitations as to the amount of energy that can be stored, and the dissipation of stored energy over time. Further, converting pressurized air back to electricity is a complicated and inefficient process.

Another type of energy system is the hybrid energy system. Hybrid energy systems are defined as the integration of several types of energy generation equipment, such as electrical energy generators, electrical energy storage systems, and renewable energy sources. A hybrid energy system, or hybrid power, usually includes of two or more renewable energy sources used together to provide increased system efficiency as well as greater balance in energy supply. Hybrid systems combine two or more modes of electricity generation together, for example, using renewable technologies such as solar photovoltaic (PV) and wind turbines. Hybrid systems provide a high level of energy security through the mix of generation methods, and can incorporate a storage system (e.g., battery, fuel cell) or small fossil fueled generator to ensure maximum supply reliability and security. The basic components of such systems are power sources (e.g., wind turbine, diesel engine generator and solar arrays), and the battery and the power management center, which regulates power production from each of the sources. The advantages of hybrid energy systems include the provision of power on a continual basis without any interruption, as the batteries connected therein store energy for later use, these batteries also increase the utilization of the renewable energy sources, lower maintenance costs, provide higher efficiency, and improved load management. The disadvantages of hybrid energy systems include increased process control complexity given the different energy source types and their interaction and coordination must be precisely controlled, higher installation costs, battery life and the overall load capacity that can be connected to the system.

Some hybrid energy systems incorporate hydrogen power as one or more components of the system. However, one of the major issues with hydrogen power is the ability to have dedicated, efficient, and sustainable input power to supply the power intensive demand necessary for the hydrogen creation process (i.e., an atmospheric moisture extraction-electrolysis cycle). Currently, most hydrogen is produced from fossil fuels, such as natural gas. Hydrogen is also produced by electricity transmitted via the grid or from renewable sources including biomass, geothermal, solar, wind, etc. The electrical grid is not the ideal source of electricity for electrolysis, however, because most of the electricity is generated using technologies that result in greenhouse gas emissions and are energy intensive.

Accordingly, there is need for multi-hybrid power generator system that improves energy harvesting by allowing for efficient generation and storage of hydrogen for use in an electric power generation system.

SUMMARY OF THE INVENTION

The present invention is directed to a multi-hybrid power generator and system that facilitates energy harvesting, generation, and storage from interchangeable power sources.

In a first implementation of the invention, a multi-hybrid power generator system for harvesting energy from an interchangeable power source is provided including one or more battery banks electrically connected to receive and store energy from an interchangeable power source in hydraulic electrical actuation devices (HEADs) that are initially powered by one or more battery banks. The HEADs drive mechanical energy through pistons to piston rods, each having a pair of retracting springs connected thereto. The piston is located within a hydraulic chamber. The system also includes a crankshaft driven by the pistons and an intelligent power controller communicatively coupled to at least one electrical load and to a number of power management devices. The intelligent power controller controls energy monitoring, energy generation, energy distribution, and energy storage between the battery banks, the electrical load, the interchangeable power source, and the HEADs.

In a second implementation of the invention, a method for providing power using a multi-hybrid power generator system is provided. The method includes controlling a first subset of HEADs of the multi-hybrid power generator system to power a first power generator, controlling a second subset of HEADs to power a second power generator, controlling both the first subset and the second subset of HEADs in unison to drive the first power generator and the second power generator, and alternating among the three previous steps of controlling to provide efficient energy generation and to keep a portion of the multi-hybrid power generator system in a cooling cycle mode.

In a second implementation of the invention, a multi-hybrid power generator system is provided including one or more battery banks electrically connected to receive and store energy from an interchangeable power source in HEADs that are initially powered by the battery bank. The HEADs drive mechanical energy through pistons to piston rods, each having a pair of retracting springs connected thereto. Each retracting spring is made of a spring material and is balanced at an operating angle to increase the effect of the piston on the crankshaft. The piston is disposed within a hydraulic chamber. The system also includes an intelligent power controller communicatively coupled to an electrical load and to a number of power management devices. The intelligent power controller controls energy monitoring, energy generation, energy distribution, and energy storage between the battery banks, the electrical load, the interchangeable power source, and the HEADs.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in the Figures herein. Furthermore, there is no intention to be bound by any expressed or implied theory presented in the preceding technical field, background, summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed to a multi-hybrid power generator and system that facilitates energy harvesting, generation, and storage from interchangeable power sources.

Figure 1:
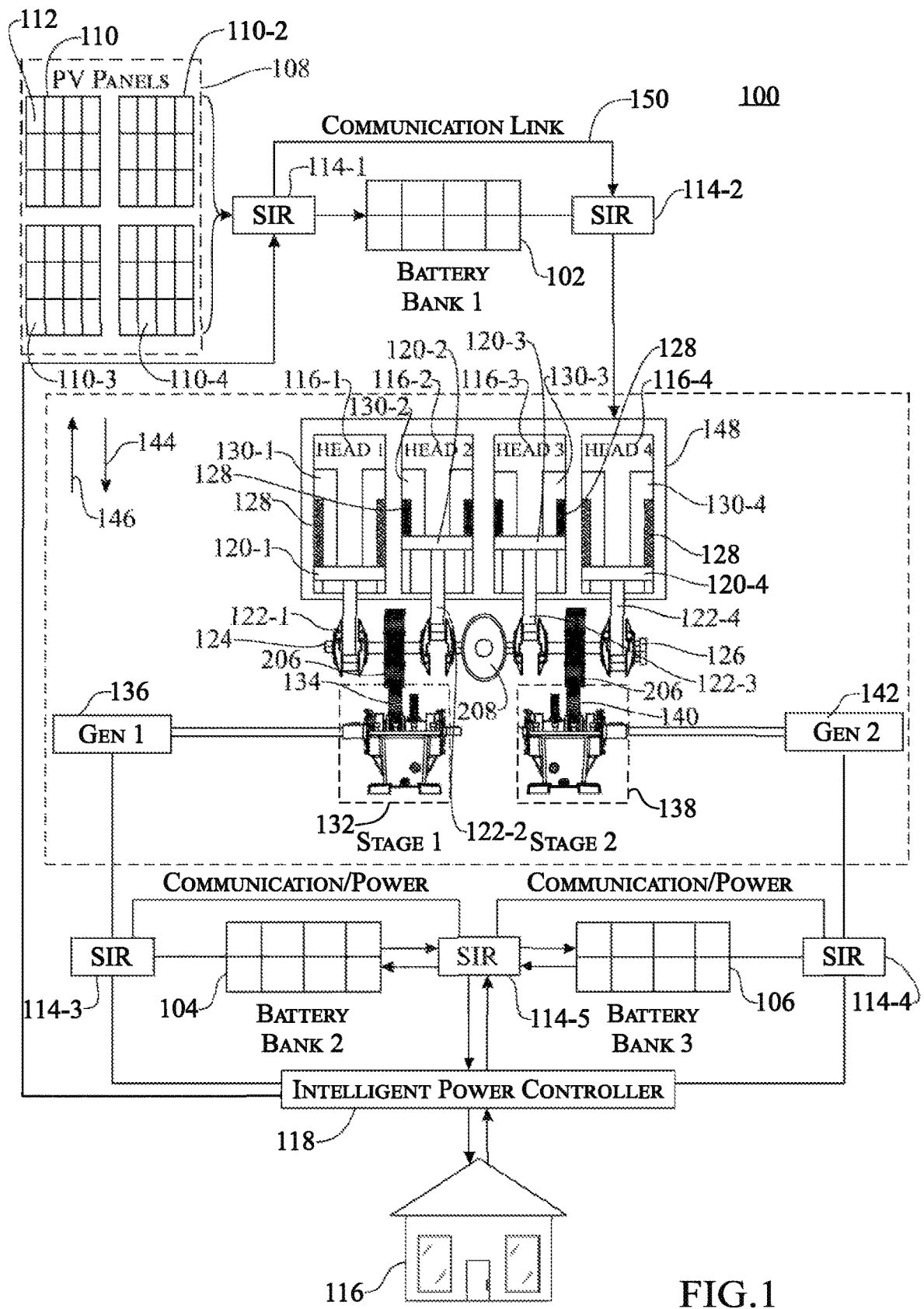
FIG. 1 presents a schematic of a multi-hybrid power generator system in accordance with an embodiment of the invention.

FIG. 1 presents a schematic of a multi-hybrid power generator system 100 in accordance with an embodiment of the present invention. As shown for instance in FIG. 1, the multi-hybrid power generator system 100 includes a plurality of battery banks (i.e., battery bank 1 102, battery bank 2 104 and battery bank 3 106). The plurality of battery banks is matched with the type of energy to be harvested from interchangeable power source 108 for, among other things, providing power to at least one electrical load 116, which is shown illustratively as a home that has an electrical load to run the household devices, for example. The plurality of battery banks (i.e., battery bank 1 102, battery bank 2 104 and battery bank 3 106) may be one of several different types of batteries including but not limited to lead acid, lithium ion, nickel cadmium (NiCd), nickel iron (NiFe), saltwater or absorbed glass mat (AGM). In accordance with an embodiment, battery bank 1 102, battery bank 2 104 and battery bank 3 106 are all the same type (e.g., NiCd) and are of a substantially equal size and capacity. While three battery banks are illustrated, more or fewer than three battery banks may be utilized without departing from the broader aspects of the invention. In accordance with the embodiments herein, the interchangeable power source 108 may be any natural, alternative and/or renewable energy power source including, but not limited to, solar power, wind power, or hydropower. For example, as shown in FIG. 1, the interchangeable power source is solar power using a plurality of photovoltaic (PV) solar panels (i.e., PV solar panel 110-1, PV solar panel 110-2, PV solar panel 110-3 and PV solar panel 110-4), with each PV solar panel including a plurality of photovoltaic cells 112. Illustratively, each of the PV solar panels may be configured as a 12-volt, 1.5-amp panel, taking into consideration the requirement of powering the at least one electrical load 116. As will be readily understood, a photovoltaic panel is comprised of numerous photovoltaic cells, with each cell having the ability to convert sunlight into electricity. In accordance with the principles of the embodiments disclosed herein, the multi-hybrid power generation system 100 will harvest, generate, store and supply energy without the need for any fossil fuels, thereby providing for a clean energy footprint as compared to other power generation systems.

As shown in FIG. 1, multi-hybrid power generator system 100 further includes a plurality of power management hydraulic electrical actuation devices (HEADs) (i.e., HEAD 116-1, HEAD 116-2, HEAD 116-3, and HEAD 116-4), and each power management device includes at least one sensor unit (e.g., sensor unit 616; See FIG. 7) for measuring power at any given time, at least one inverter unit (e.g., inverter unit 614; See FIG. 7) for changing direct current (DC) to alternating current (AC) and at least one energy router unit (e.g., energy router unit 612; See, FIG. 7) for managing power distribution. Each power management device is further communicatively coupled, via communication link 150, to an intelligent power controller 118. The intelligent power controller 118 is communicatively coupled to the electrical load 116 and to the plurality of power management devices for selectively controlling power monitoring, power generation, power distribution, and power storage between or to the plurality of battery banks (i.e., battery bank 1 102, battery bank 2 104 and battery bank 3 106), the at least one electrical load 116 and the plurality of HEADs (i.e., HEAD 116-1, HEAD 116-2, HEAD 116-3, and HEAD 116-4). The configuration of the plurality of HEADs as depicted in FIG. 1 is one of various configurations that may be used in accordance with the principles of the disclosed embodiments.

Referring to FIG. 1, in accordance with an embodiment, the output of the interchangeable power source 108, for example, the energy output of the plurality PV solar panels (i.e., PV solar panel 110-1, PV solar panel 110-2, PV solar panel 110-3 and PV solar panel 110-4) is harnessed through the SIR 114-1 and transferred to the first battery bank 102, thereby providing an immediate power storage option. In this way, the first battery bank 102 is electrically connected to receive and store energy from the interchangeable power source 108, and the first battery bank 102 is electrically connected to a first power management device (i.e., power management unit 114-1) and a second power management device (i.e., power management unit 114-2) of the plurality of power management devices. As necessary, the inverter unit 614 of the HEAD 116-1 inverts the direct current (e.g., delivered by the plurality of PV solar panels) to alternating current. Further, this power stored in the first battery bank 102 is managed by the second power management unit 114-2 and is used to initially power a multi-hybrid generator 148 including the plurality of HEADs (i.e., HEAD 116-1, HEAD 116-2, HEAD 116-3 and HEAD 116-4). The HEADs are used to convert a source energy (e.g., electrical energy) into mechanical/hydraulic motion. In an embodiment, each HEAD includes a hydraulic-electric pump. In a further embodiment, each HEAD includes an electrical actuator.

The plurality of HEADs, as initially powered by the first battery bank 102, will drive mechanical energy through a combination of a plurality of pistons (i.e., piston 120-1, piston 120-2, piston 120-3 and piston 120-4) and a plurality of piston rods (i.e., piston rod 122-1, piston rod 122-2, piston rod 122-3 and piston rod 122-4). The first piston 120-1 is located within a first hydraulic chamber 130-1 of a plurality of hydraulic chambers and is mechanically connected to the first piston rod 122-1 of the plurality of piston rods. In turn, this mechanical energy is transferred to a first crankshaft 124 and a second crankshaft 126, respectively (each crankshaft configured as shown in crankshaft 200 of FIG. 2). Each of the first crankshaft 124 and second crankshaft 126 have a respective driving gear 206 that is located at a respective center point 212 along the respective crankshaft (depicted in detail in FIG. 2). In turn, the first drive gear 206 of the first crankshaft 124 is mechanically connected to a first set of gears 134 of a first gearbox 132, and the second drive gear 206 of the second crankshaft 126 is mechanically connected to a second set of gears 140 of a second gearbox 138. Each gearbox and respective set of gears are configured as shown in gearbox 300 of FIG. 3, as further detailed herein below.

Figure 4A:
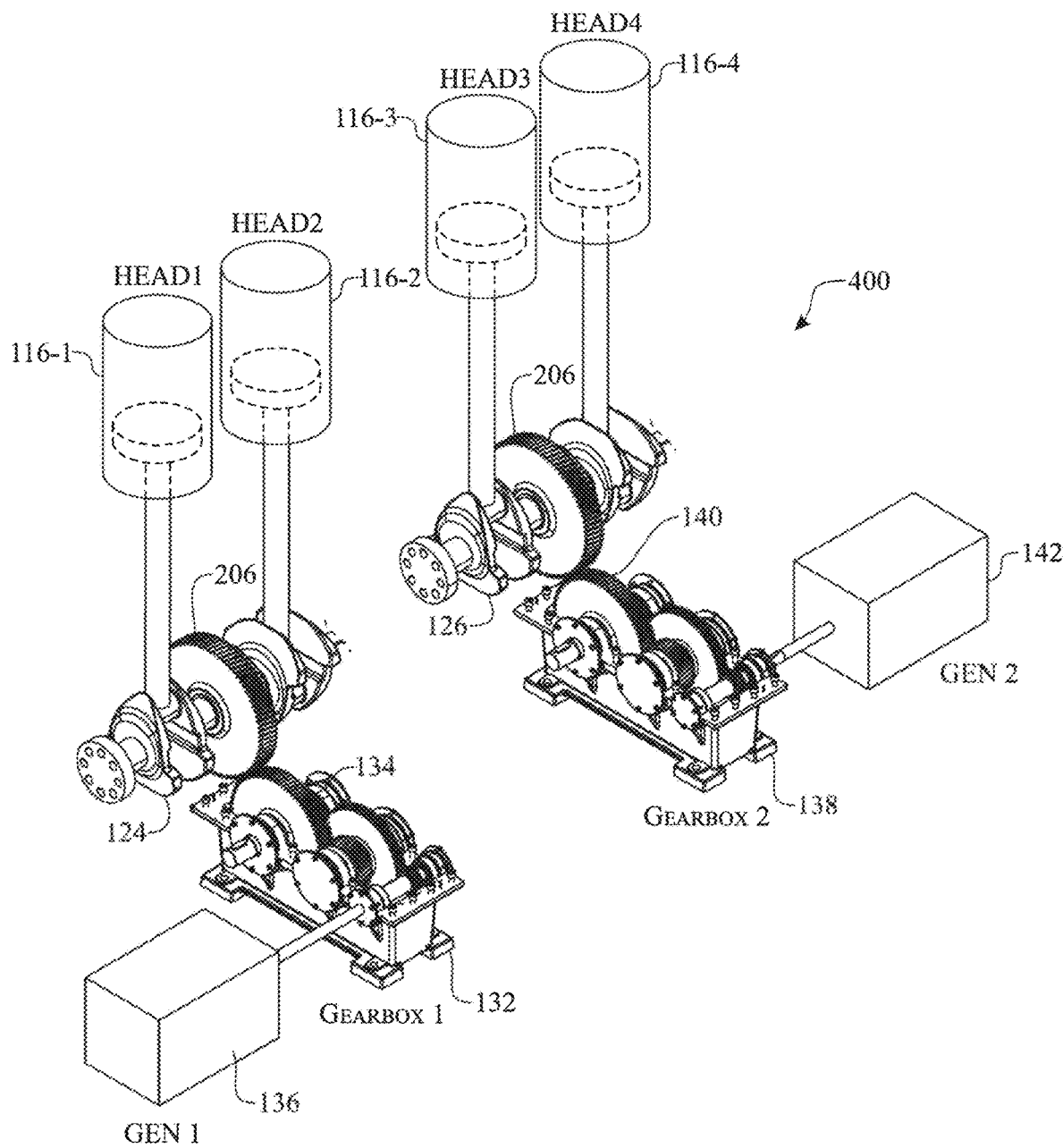
FIG. 4A presents a perspective view of an illustrative engagement between the crankshaft of FIG. 2 and the gearbox of FIG. 3 for use in the multi-hybrid power generator system of FIG. 1 in accordance with an embodiment of the invention, and showing the location of retracting springs.
Figure 4B:
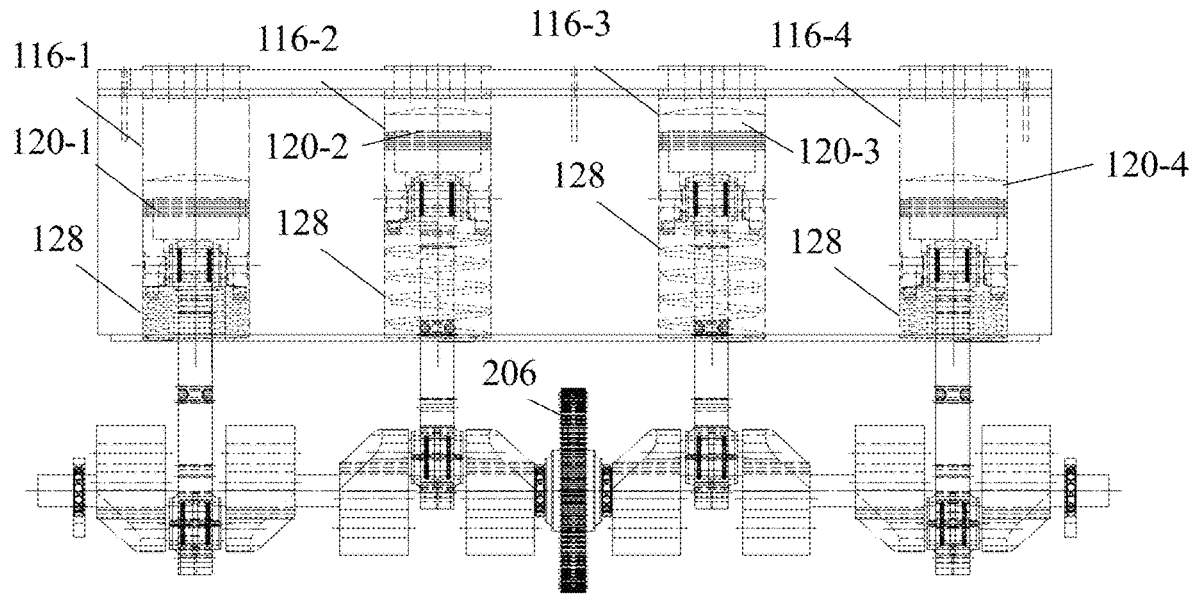
FIG. 4B presents a front view of an illustrative engagement between the crankshaft and the gearbox, and showing an alternative configuration of the retracting springs according to an embodiment of the invention.
Figure 4C:
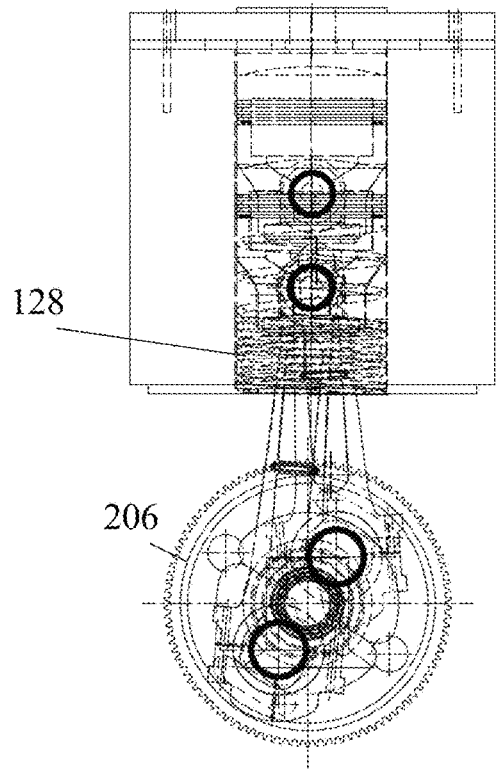
FIG. 4C presents a side view of the portion of the system of FIG. 4B.

The first HEAD 116-1 of the plurality of HEADs provides a hydraulic force that drives the first piston 120-1 of the plurality of pistons (and the respective piston 122-1) and the first piston 120-1 has a first pair of retracting springs 128 connected thereto (depicted in detail in FIGS. 4B and 4C). The upward force during the retraction of the first HEAD 116-1 is supported by the first pair of retracting springs 128 that run along the outside of the first HEAD 116-1 that is driving the first piston 120-1 such that the first pair of retracting springs 128 support an upward motion (along upward direction 146) during the retraction of the first HEAD 116-1 and returning of the first piston 120-1 back to an original position. Each of the other HEADs (i.e., HEAD 116-2, 116-3 and 116-4) have a corresponding pair of retracting springs 128 that function in the same manner. In this way, each corresponding piston-to-piston rod combination set has a pair of retracting springs 128 that run along their side that assist in the retracting of the piston from a corresponding down stroke (along downward direction 144) thereby significantly increasing the overall efficiency of the multi-hybrid generator 148 and the multi-hybrid generator system 100. The retracting springs 128 increase the efficiency of the pistons by decreasing the work of the piston, specifically on the upstroke, working against the force of gravity. It will be appreciated that while retracting springs 128 are shown as a pair there are any number of further embodiments that may include different numbers of springs.

In an embodiment, the retracting springs are fabricated using a specially formulated spring alloy composed of approximately 55% high carbon steel, 24% titanium (Ti), and 21% vanadium (V). This formulation supports an anti-gravity effect thereby increasing overall efficiency of the respective crankshafts. Further, the density of the material (See, equation (1), herein below) impacts the efficacy of the spring (e.g., spring efficiency). The embodiments herein call for an alloy with specific strength, malleability, torsion strain/stress resistance, and heat dissipation. In an embodiment, the natural frequency of the retracting spring is approximately twenty (20) times the frequency of application of a periodic load. This avoids resistance with all harmonic frequencies up to the twentieth (20th) order. In an embodiment, the natural frequency of the retracting springs 128, as configured in FIG. 1, is given by equation (1):

$$Fn = (d/2\pi \times D^2 \times n) \times \sqrt{(6G \times g/\beta)}; \qquad (1)$$

where:
$d$=Diameter of the wire;
$D$=Mean diameter of the spring;
$n$=Number of active turns;
$G$=Modulus of rigidity;
$g$=Acceleration due to gravity; and
$\beta$=Density of the material of the spring.

It will be understood that above-identified spring alloy formulation is only one such formulation that may be used consistent with the principles of the disclosed embodiments herein.

Further, the modified coefficient of linear expansion (a) (See, equation (2) herein, below) of the specially formulated spring alloy is an important feature of the retracting springs 128, because when an object is heated or cooled the object's length changes by an amount proportional to the object's original length and the change in temperature. Thus, given the expected high pressure and high heat generated by the multi-hybrid generator 148 and its constituent components, this coefficient is an important design consideration. In accordance with an embodiment, the linear thermal expansion change in length of the retracting springs 128 is given by equation (2):

$$\Delta L = L0 \times \alpha \times (t_0 - t_1); \qquad (2)$$

where:
$\Delta L$=change in length of the object;
$L0$=Original length of the object;
$\alpha$=modified coefficient of linear expansion with the special alloy materials has altered this coefficient increasing resistance against gravity in the upstroke of the crankshaft;
$t_0$=initial temperature; and
$t_1$=final temperature.

Each HEAD disclosed herein specifically addresses the hydraulic and reverse spring motion (i.e., anti-gravity displacement) upward forces on the upstroke that yield the specific required output on the drive gear of the crankshaft. An optimum needed torque output on the drive gear (at the center of the crankshaft) is required for the system to have a final output of electricity production with more than 76% efficiency (converting energy in the form of electricity/pressure to mechanical energy/torque). A Hydraulic Electrical Actuation Constant Optimum Efficiency (HEACOE) is defined by formula (3):

$$F/t(pV2/2\sigma t) + \sqrt{(\mu Pg \times 0.7/\Delta h)} = \text{Constant}; \qquad (3)$$

where:
$F$=Force;
$P$=Pressure;
$\rho$=Density;

V=Velocity;
g=Gravitational force due to acceleration;
h=Height (discharge total);
σt=Allowable tensile resistance,
μ=Coefficient; and
t=Time.

Further, the second HEAD 116-2 of the plurality of HEADs drives a second piston 120-2 of the plurality of pistons having a second pair of retracting springs 128 connected thereto, the second piston 120-2 being located within a second hydraulic chamber 130-2 and mechanically connected a second piston rod 120-2 of the plurality of piston rods, and the first piston rod 120-1 and the second piston rod 120-2 are connected to the first crankshaft 124. A third HEAD 116-3 of the plurality of HEADs drives a third piston 120-3 of the plurality of pistons having a third pair of retracting springs 128 connected thereto, the third piston 120-3 being located within a third hydraulic chamber 130-3 and connected to a third piston rod 122-3 of the plurality of piston rods. A fourth HEAD 116-4 of the plurality of HEADs drives a fourth piston 120-4 of the plurality of piston having a fourth pair of retracting springs 128-4 connected thereto, the fourth piston being located within a fourth hydraulic chamber 130-4 and connected to a fourth piston rod 122-4 of the plurality of piston rods. The third piston rod 122-3 and the fourth piston rod 122-4 are mechanically connected to the second crankshaft 126. In accordance with an embodiment, the first crankshaft 124 is mechanically connected through the first drive gear to the first set of gears of the first gearbox 132, with the first crankshaft also including a first counterweight 202 and a second counterweight 204 connected thereto (depicted in detail in FIG. 2).

With further reference to FIGS. 4B and 4C, the retracting springs 128 may be configured as helical springs positioned inside the piston/hydraulic chambers 130-1, 130-2, 130-3, 130-4. In an embodiment, the springs 128 may be configured as tension springs.

Figure 2:
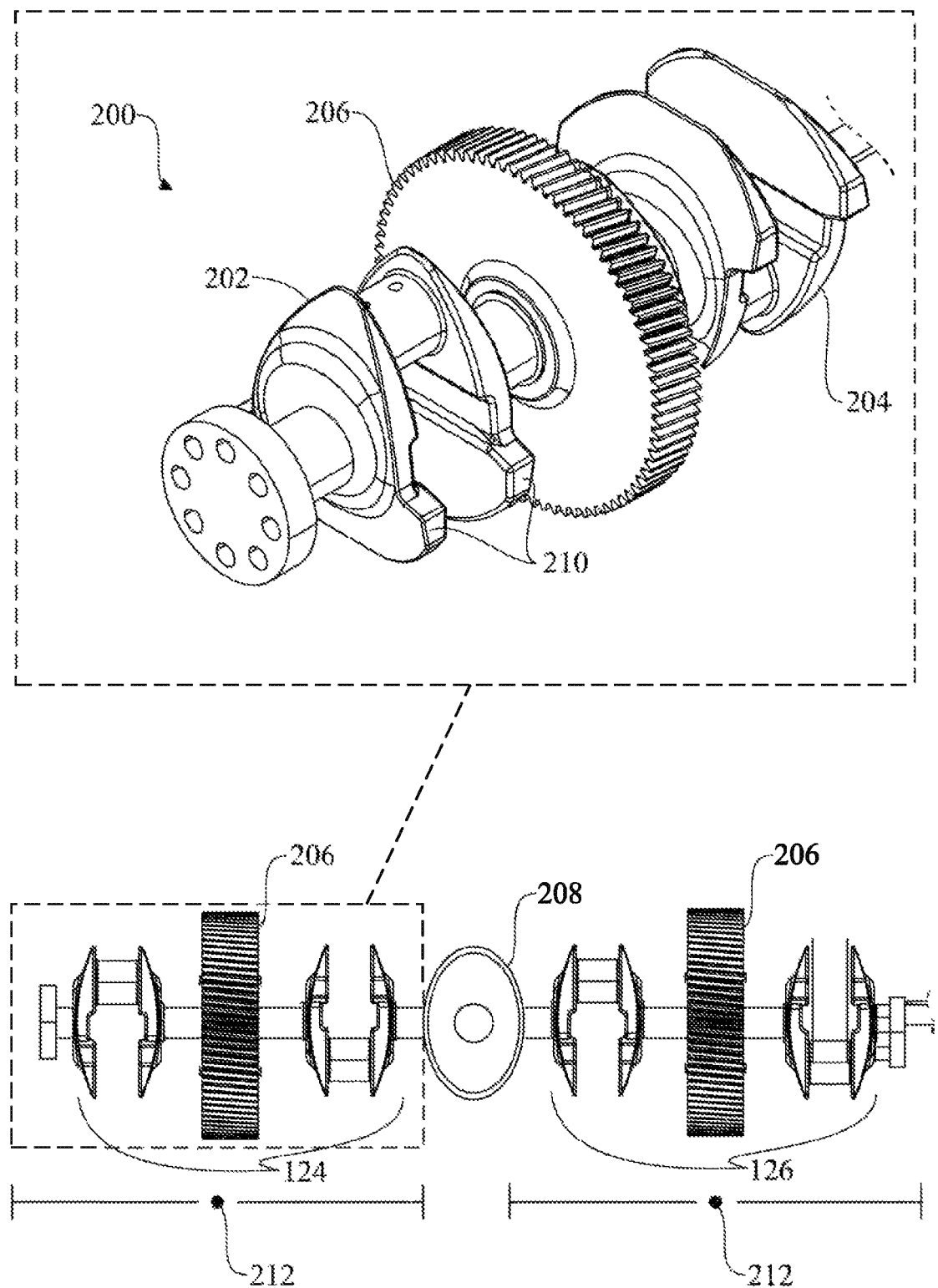
FIG. 2 presents a perspective view of a crankshaft for use in the multi-hybrid power generator system of FIG. 1 in accordance with an embodiment of the invention.
Figure 3:
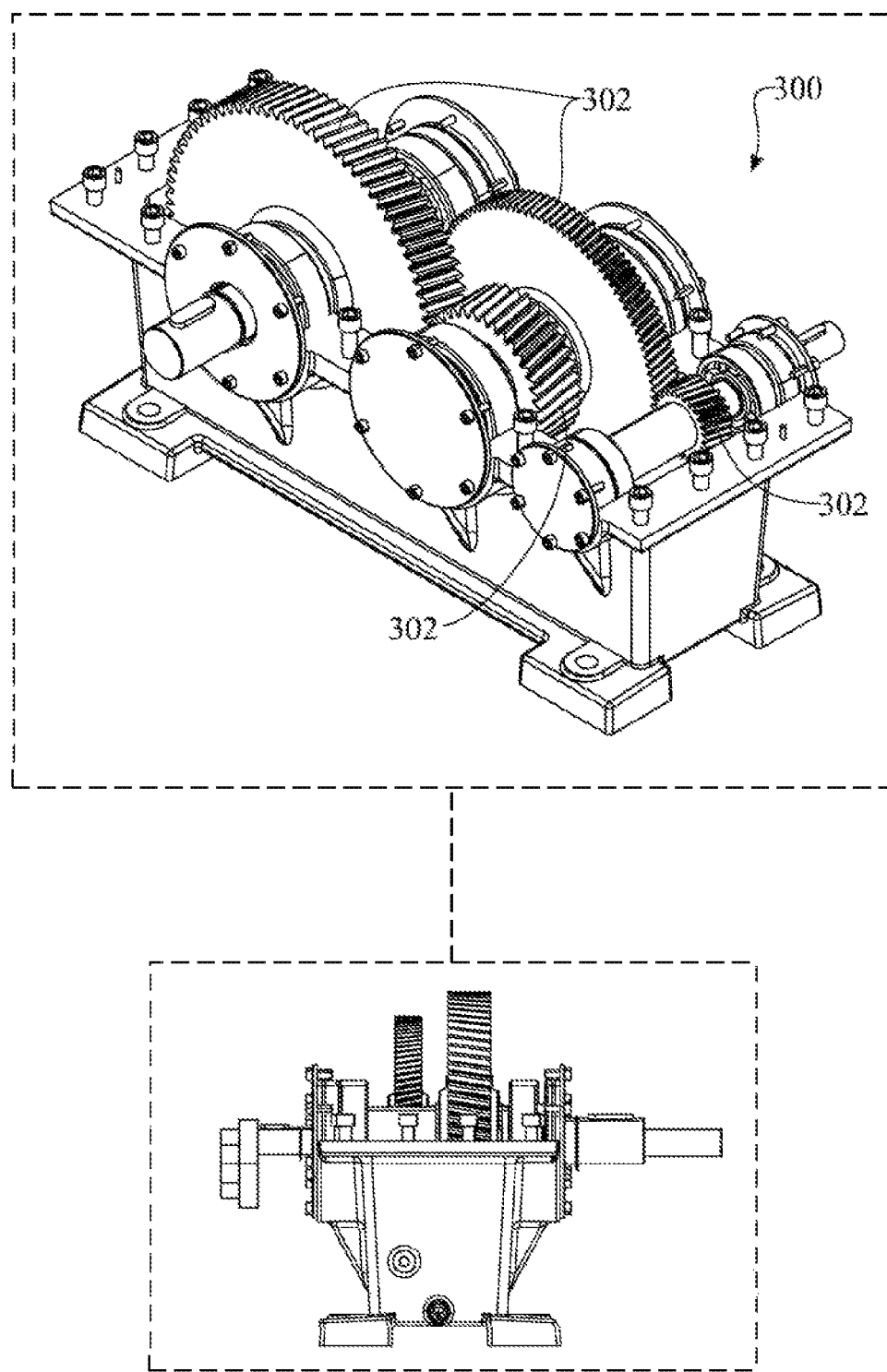
FIG. 3 presents a perspective view of a gearbox for use in the multi-hybrid power generator system of FIG. 1 in accordance with an embodiment of the invention.

Referring to FIG. 2, a perspective view of a crankshaft 200 is shown for use in the multi-hybrid power generator system 100 of FIG. 1 in accordance with an embodiment. The crankshaft 200 has a weighted separator support joint 208 mechanically joining the first crankshaft 124 and the second crankshaft 126. The weighted separator support joint 208 separates and balances the first crankshaft 124 and the second crankshaft 126 to allow for the independent operation of one from the other. Further, the first HEAD 130-1 and the second HEAD 130-2 form a first HEAD set or subset and the third HEAD 130-3 and the fourth HEAD 130-4 form a second HEAD set or subset. Each HEAD set powers a respective section of the crankshaft 200 by mechanically driving their respective gearbox via the set of gears specific thereto. FIG. 3 presents a perspective view of a gearbox 300 for use in the multi-hybrid power generator system 100 of FIG. 1 in accordance with an embodiment of the invention. Each of the first gearbox 132 and the second gearbox 138 are configured the same as the gearbox 300 including a set of gears 302. The HEADs are depicted in a straight in-line orientation, but alternate orientations including, but not limited to, V-shaped orientations, may be utilized without departing from the broader aspects of the invention.

As such, each crankshaft 200 (i.e., crankshaft 124 and crankshaft 126) will drive the respective gearboxes (i.e., gearbox 132 and gearbox 138, respectively) by and through the respective drive gear on the crankshaft that is mechanically connected to the respective set of gears (i.e., first set of gears 134 and second set of gears 140) such that the efficiency of the multi-hybrid generator 148 and the multi-hybrid power generator system 100 is increased and the multi-hybrid power generator 148 will operate at overall lower/cooler operating temperatures, given the independent operation of the crankshaft sections in accordance with the embodiment. As shown, in addition to the drive gear 206, the crankshaft 200 includes a plurality of counterweights 210 inclusive of the first counterweight 202 and the second counterweight 204, as noted above. In an embodiment, a first counterweight is connected proximate to a point where the first piston 120-1 is connected to the first crankshaft 124 and a second counterweight is connected proximate to a point where the second piston 120-2 is connected to the first crankshaft 124. Similarly, a third counterweight is connected proximate to a point where the third piston 120-3 is connected to the second crankshaft 126 and a fourth counterweight is connected proximate to a point where the fourth piston 120-4 is connected to the second crankshaft 126. In this way, at each corresponding point on the crankshaft 200 where the plurality of piston rods move in a downward direction 144 there is a corresponding counterweight that works in conjunction with the existing gravitational forces generated on the downstroke of the pistons in the downward direction 144. As such, the continuous motion of the plurality of piston rods on each crankshaft section rotates and mechanically drives its respective gearbox (i.e., the gearbox 132 or the gearbox 138). The mechanical downward movement of the plurality of HEADs, as described herein, in conjunction with the downward gravitational forces on the counterweights increases the efficiency of such piston downstrokes as a function of both crankshaft torque and rotational efficiency. Similarly, the upward direction 146 movement of the plurality of HEADs in conjunction with the respective pairs of retracting springs supporting such upward movement and associated forces will increase the efficiency of the upwards strokes of the plurality of pistons as a function of crankshaft torque and rotation as well as the overall efficiency of the plurality of HEADs, both collectively and individually. In an embodiment, the force generated by the downstroke of each piston is approximately 16 pounds per square inch. This allows a set or subset of HEADs to operate with approximately 26 pounds per square inch of pressure with alternating subsets of two heads moving to downstroke in unison. The operation of the HEAD subsets allows to pressure to remain variable depending on the application and/or system needs.

Turning back to FIG. 1, the second crankshaft 126 is mechanically connected to the second generator 142, via its respective second drive gear that is mechanically connected to the second set of gears 140 of the second gearbox 138, and includes a third counterweight and a fourth counterweight connected thereto. Thus, each respective gearbox system mechanically drives the respective generator connected thereto. The first HEAD 116-1 and the second HEAD 116-2 ultimately drive the first set of gears 134 of the first gearbox 132 for powering a first generator 136 (depicted in detail in FIG. 3). In this way, the first generator 136 is mechanically connected to the first gearbox 132 and communicatively connected to a third power management device 114-3 of the plurality of power management devices for the supplying of electrical power to the second battery bank 104 (i.e., battery bank 2 104) of the plurality of battery banks. The second battery bank 104 of the plurality of battery banks is electrically connected to receive and store energy from the first generator 136 that is managed by the third power management device 114-3 of the plurality of power management devices that is electrically thereto. Similarly, the third HEAD 116-3 and the fourth HEAD 116-4 ultimately drive the second set of gears 140 of the second gearbox 138 for powering a second generator 142 (depicted in detail in FIG. 3). The second generator 142 is electrically connected to and supplies electrical power to the third battery bank (i.e., battery bank 3 106) of the plurality of battery banks. The third battery bank 106 of the plurality of battery banks is electrically connected to receive and store energy from the second generator 142 such that the third battery bank is electrically connected to the fourth power management device 114-4 of the plurality of power management devices for such purposes. The second generator 142 is mechanically connected to the second gearbox 138 and communicatively connected to the fourth power management device 114-4 of the plurality of power management devices as well. A fifth power management device 114-5 is communicatively coupled to the battery bank 104 and the battery bank 106 for managing power therebetween. In accordance with an embodiment, and at the direction of the intelligent power controller 118, the battery bank 104 and the battery bank 106 may supply power either simultaneously or alternatively to both the plurality of HEADs and the at least one electrical load 116 to optimize the overall efficiency of the multi-hybrid power generator system 100. Advantageously, the ability to mechanically drive the respective gearboxes either synchronously, independently, or alternatively significantly increases the efficiency and the durability of the multi-hybrid power generator system 100 by avoiding continuous mechanical motion without some defined resting period.

In accordance with the disclosed embodiments, the first battery bank 102 initially powers the plurality of HEADS 116-1, 116-2, 116-3, 116-4 that in turn mechanically power the respective piston/piston rod combinations. The piston/piston rod combinations mechanically power a respective drive gear of a respective crankshaft with each drive gear mechanically powering a respective set of gears of a respective gear box. Each gear box in turn mechanically powers a respective generator that generates electrical power that is supplied to and stored by multiple battery banks (e.g., battery banks 104, 106) that further satisfies at least one electrical load (e.g., a home). This is further illustrated in FIGS. 4A-4C, which presents a perspective view of an illustrative engagement 400 between the crankshaft of FIG. 2 and the gearbox of FIG. 3, for use in the multi-hybrid power generator system of FIG. 1 in accordance with an embodiment of the invention. As shown, and as detailed above, the first driving gear 206 of the first crankshaft 124 are engaged and in similar fashion, the second driving gear 206 of the second crankshaft 126 are engaged, such that the piston/piston rod combinations mechanically power the respective drive gear of the respective crankshaft with each drive gear mechanically powering a respective set of gears of a respective gear box (i.e., the first gearbox 132 and the first set of gears 134, and the second gearbox 138 and the second set of gears 140). Each gear box in turn mechanically powers a respective generator (i.e., the first generator 136 and the second generator 142) that generates electrical power that is supplied to and stored by multiple battery banks, that further satisfies at least one electrical load (e.g., a home). As best shown in FIG. 2, the first driving gear 206 is located at a first center point 212 along the first crankshaft 124, and is mechanically connected to the first set of gears 134 of the first gear box 132 for driving the first set of gears 134 of the first gearbox 132. Similarly, the second driving gear 206 is located at a second center point 212 along the second crankshaft 126, and is mechanically connected to the second set of gears 140 of the second gear box 138 for driving the second set of gears 140 of the second gearbox 138. In another aspect, a gear pulley or belt assembly (not shown) is employed with the respective gearboxes to couple the gearbox with the generator.

Figure 5:
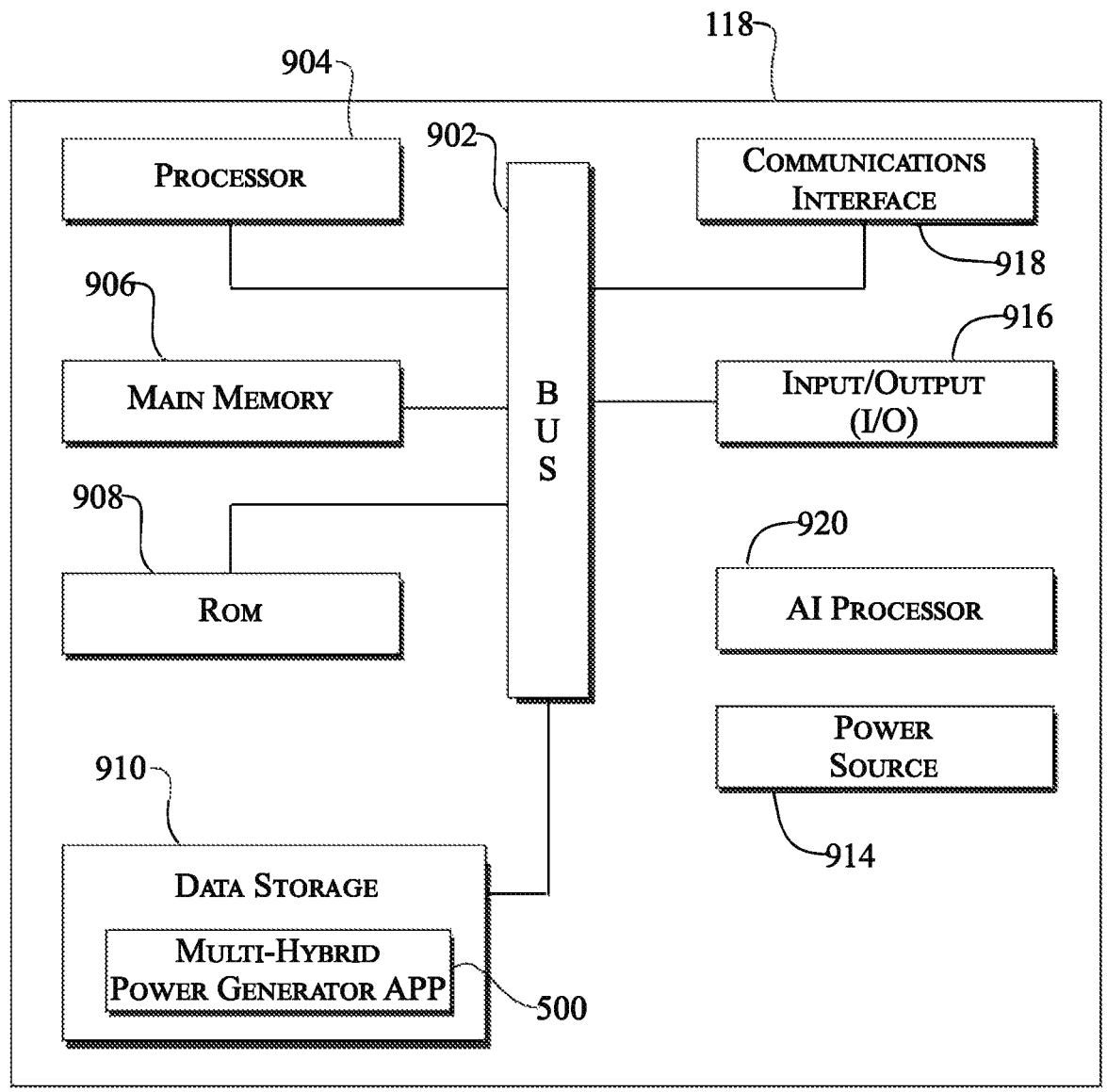
FIG. 5 presents an illustrative intelligent power controller configured for use in the multi-hybrid power generator system of FIG. 1 in accordance with an embodiment of the invention.
Figure 6:
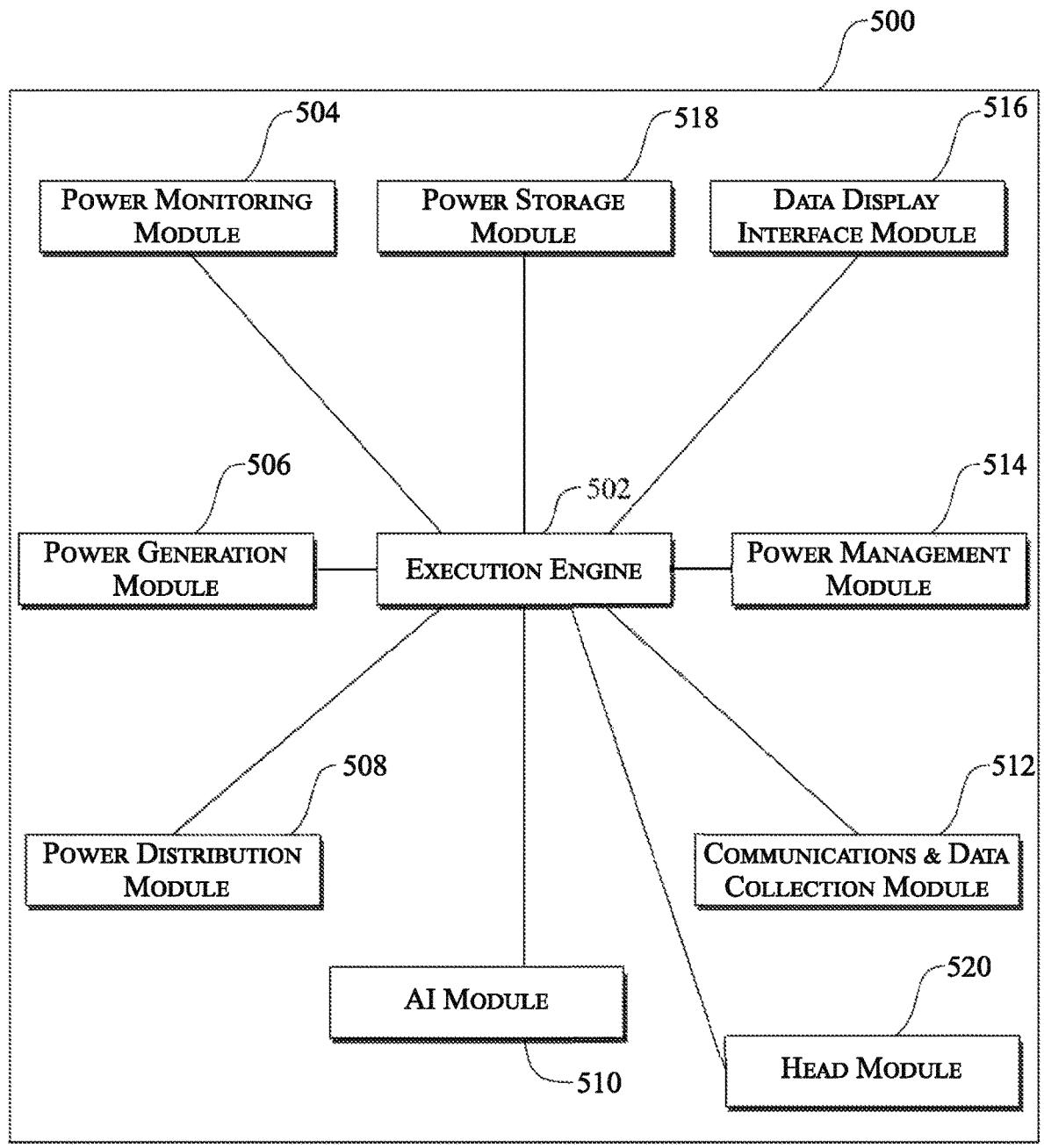
FIG. 6 presents an illustrative architecture for a multi-hybrid power generation application for use with the multi-power generator system of FIG. 1 in accordance with an embodiment of the invention.

Referring to FIGS. 5 and 6, the intelligent power controller 118 and the multi-hybrid power generator application 500 will now be discussed in further detail. FIG. 5 shows the illustrative intelligent power controller 118 configured for use in the multi-hybrid power generator system 100. The intelligent power controller 118 includes bus 902 and processor 904 coupled to the bus 902 for executing operations and processing information associated with the multi-hybrid power generator system 100. As will be appreciated, an "intelligent power controller" in the context herein includes a wide variety of devices such as a dedicated hardware device, smartphones, laptop computers, servers, tablets, and wearable device, to name just a few, that execute software and/or mobile applications in accordance with the principles of the embodiments disclosed herein. The processor 904, as powered by power source 914, may include both general and special purpose microprocessors, and may be the sole processor or one of multiple processors of the device. Further, the processor 904 may include one or more central processing units (CPUs) and may include, be supplemented by, or incorporated in, one or more application-specific integrated circuits (ASICs) and/or one or more field programmable gate arrays (FPGAs). The artificial intelligence (AI) processor 920 may be used to execute an AI protocol to enhance the operations of the multi-hybrid power generator system 100 by, for example, collecting and interpreting data provided by the plurality of power management units to generate various responses and actions to be taken by the plurality of power management units with respect to power monitoring thereby increasing the overall efficiency of the multi-hybrid power generator system 100.

The intelligent power controller 118 may also include main memory 906 coupled to the bus 902 for storing computer-readable instructions to be executed by the processor 904. The main memory 906 may also be utilized for storing temporary variables or other intermediate information during the execution of the instructions by the processor 904. The intelligent power controller 118 may also include read-only memory (ROM) 908 or other static storage device(s) coupled to the bus 902. Further, data storage device 910, such as a magnetic, optical, or solid-state devices may be coupled to the bus 902 for storing information and instructions for the processor 904 including, but not limited to, the multi-hybrid power generator application 500. Data storage device 910 and the main memory 906 may each include a tangible non-transitory computer readable storage medium and high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

The intelligent power controller 118 may also include one or more communications interface 918 for communicating with other devices via a network (e.g., a wireless communications network) or communications protocol (e.g., Bluetooth®) such communications by among the plurality of power management device and the intelligent power controller 118 cover communication link 150. Such communication interfaces may be a receiver, transceiver or modem for exchanging wired or wireless communications in any number of well-known fashions. In some embodiments, the communications interface 918 are an integrated services digital network (ISDN) card or modem/router used to facilitate data communications of various well-known types and formats. Further, illustratively, the communications interface 918 may be a local area network (LAN) card used to provide data communication connectivity to a comparable LAN. Wireless communication links may also be implemented.

As will be appreciated, the functionality of the communication interface 918 is to send and receive a variety of signals (e.g., electrical, optical, or other signals) that transmit data streams representing various data types. The intelligent power controller 118 may also include one or more input/output devices 916 that enable user interaction with the intelligent power controller 118 (e.g., camera, display, keyboard, mouse, speakers, microphone, buttons, etc.). The input/output devices 916 may include peripherals, such as a camera, printer, scanner, display screen, etc. For example, the input/output devices 916 may include a display device such as a cathode ray tube (CRT), plasma or liquid crystal display (LCD) monitor for displaying information to the user, a keyboard, and a pointing device such as a mouse or a trackball by which the user can provide input to the intelligent power controller 118, and the intelligent power controller 118 may be any one of a variety of hardware devices. For example, a network-enabled portable tablet computer and/or dedicated portable hardware device, configured in accordance with FIGS. 4 and 5, may be employed in the context of the disclosed embodiments.

As noted above, the intelligent power controller 118 is communicatively coupled to the electrical load 116 and to the plurality of power management devices for selectively controlling power monitoring, power generation, power distribution and power storage between or to the plurality of battery banks (i.e., battery bank 1 102, battery bank 2 104 and battery bank 3 106), the at least one electrical load 116 and the plurality of HEADs (i.e., HEAD 116-1, HEAD 116-2, HEAD 116-3, and HEAD 116-4). In accordance with an embodiment, the delivery of the aforementioned operations is facilitated by the execution of the multi-hybrid power generator application 500, and FIG. 6 shows an illustrative architecture for the multi-hybrid power generation application 500 for use with the multi-power generator system 100. As shown, the illustrative architecture for the operation of the application 500 provides several modules and engines used to perform a variety of functions for energy harvesting, generation and storage from interchangeable power sources and for selectively controlling the power monitoring, power generation, power distribution and power storage features across the multi-hybrid power generator system 100 and, in particular, by controlling the plurality of HEADs (i.e., HEAD 116-1, HEAD 116-2, HEAD 116-3, and HEAD 116-4) which, in turn, work to control the various parts of the multi-hybrid power generator system 100, as further detailed herein. In conjunction with the operation of execution engine 502, the monitoring and controlling of the plurality of HEADs is undertaken by power monitoring module 504, power generation module 506, power distribution module 508, HEAD module 520 and power management module 514. Further, the artificial intelligence (AI) module 510 may be used to define and execute an AI protocol, through AI processor 920, to enhance the operations of the multi-hybrid power generator system 100 by, for example, collecting and interpreting data provided by the plurality of power management units to generate various responses and actions to be taken by the plurality of power management units, with respect to power monitoring, thereby increasing the overall efficiency of the multi-hybrid power generator system 100.

The communications and data collection module 512 facilitates communications and data collection between and from the intelligent power controller 118 and the plurality of HEADs (i.e., HEAD 116-1, HEAD 116-2, HEAD 116-3, and HEAD 116-4). In this way, the power distribution module 508 can route and distribute power throughout the multi-hybrid power generator system 100, as detailed herein. The power management module 514 provides overall power management with respect to the generated power from the multi-hybrid power generator system 100 including power distribution to the at least one electrical load 116 and the plurality of battery banks (i.e., battery bank 1 102, battery bank 2 104 and battery bank 3 106). The power storage module 518 controls the storage of such generated power across, for example, the plurality of battery banks (i.e., battery bank 1 102, battery bank 2 104 and battery bank 3 106). The power management module 514 also provides for operations that control and prevent overloading and overheating conditions across the various components of the multi-hybrid power generator system 100 by measuring and monitoring overall system capacity and generated power flow and directing electrical power to one or more of the plurality of batteries and/or the at least one electrical load 116. The data display interface 516 module and the communication and data collection module 512 are used to facilitate the input/output and display of power data and other information illustratively (e.g., a graphical user interface) to the users across the multi-hybrid power generator system 100.

Figure 7:
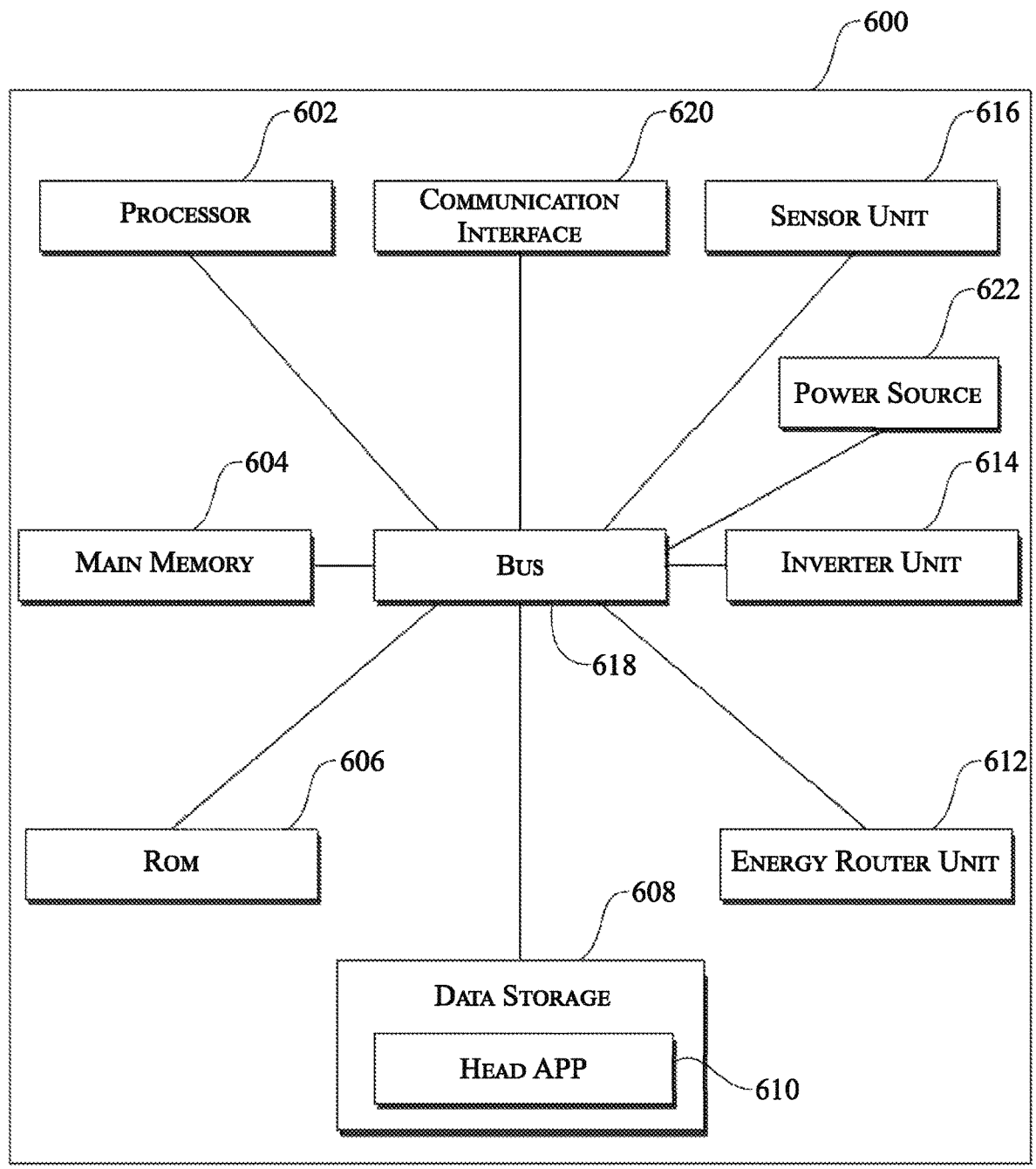
FIG. 7 presents an illustrative power management device configured for use in the multi-hybrid power generator system of FIG. 1 in accordance with an embodiment of the invention.

Referring to FIG. 7, an illustrative power management device 600 is configured for use in the multi-hybrid power generator system of FIG. 1 in accordance with an embodiment multi-hybrid power generator system 100. The illustrative power management device 600 configuration is applicable to any of the plurality of power management devices (i.e., SIR 114-1 through SIR 114-5) as shown in FIG. 1. As shown in FIG. 6, each power management unit includes at least one sensor unit 616 for measuring power at any given time, at least one inverter unit 614 for changing direct current (DC) to alternating current (AC), and at least one energy router unit 612 for managing power distribution. Communications interface 620 manages communications such that each power management unit is communicatively coupled with and to the intelligent power controller 118 for selectively controlling power monitoring, power generation, power distribution and power storage between or to the plurality of battery banks (i.e., battery bank 1 102, battery bank 2 104 and battery bank 3 106), the at least one electrical load 116, and the plurality of HEADs (i.e., HEAD 116-1, HEAD 116-2, HEAD 116-3, and HEAD 116-4). The power management device 600 is powered by power source 622 and further includes bus 618 and processor 602 coupled to the bus 618 for executing operations and processing information by the execution of HEAD app 610 as stored in data storage 608. The power management device 600 may also include ROM 606 or other static storage device(s) coupled to the bus 618. The main memory 604 may each include a tangible non-transitory computer readable storage medium or other memory devices, as detailed herein above, for storing executable code and/or other information useful in the execution the HEAD app 610.

Figure 8:
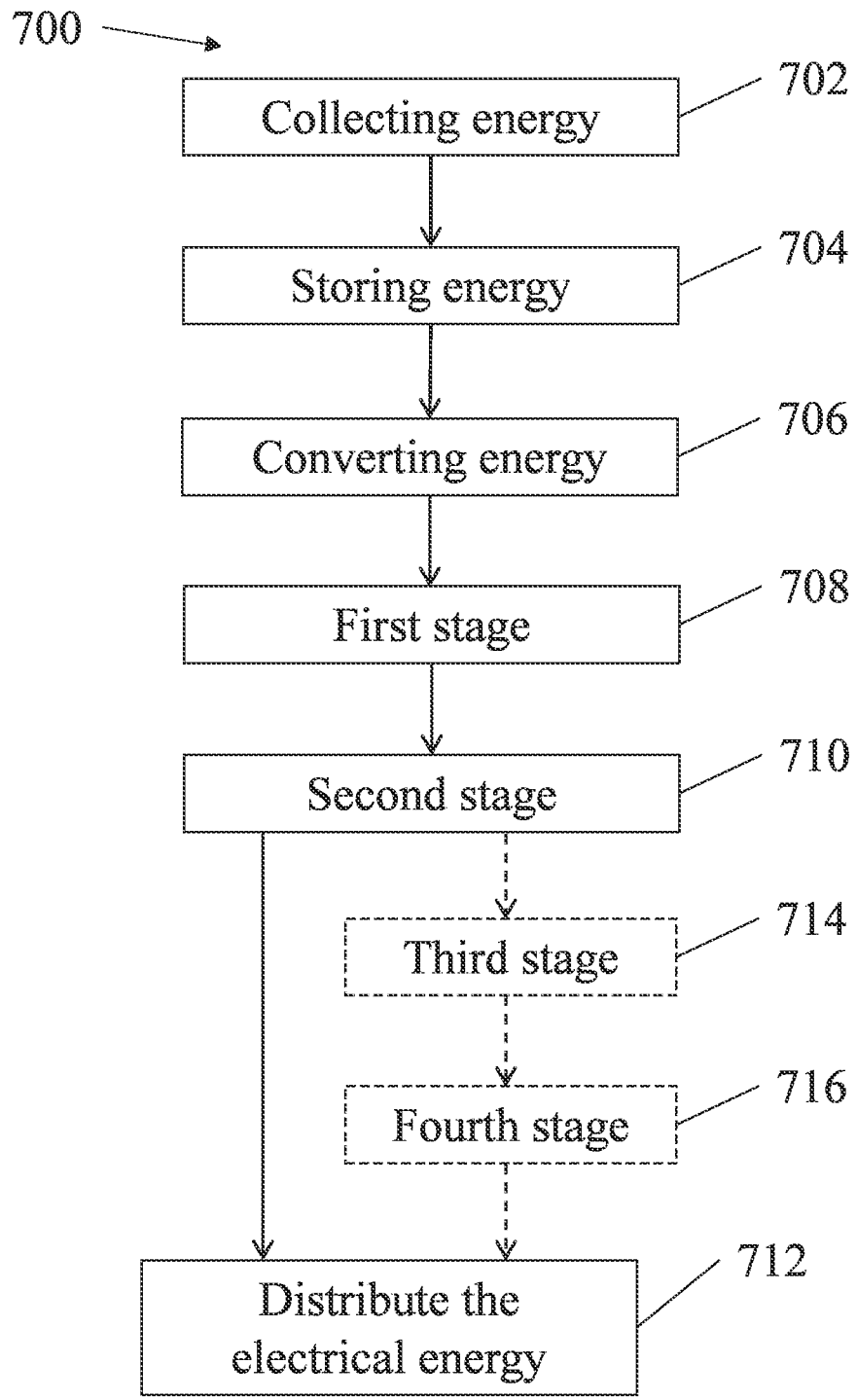
FIG. 8 presents a flowchart of operations for harvesting energy from an interchangeable power source using the multi-hybrid power generator system of FIG. 1 in accordance with an embodiment of the invention.

Referring to FIG. 8, a flowchart of illustrative operations 700 is shown for harvesting energy from an interchangeable power source using the multi-hybrid power generator system of FIG. 1, in accordance with an embodiment of the invention. As shown, the operations 700 include, at step 702, collecting energy from an interchangeable power source such as, for example, the array of photovoltaic (PV) solar panels (i.e., PV solar panel 110-1, PV solar panel 110-2, PV solar panel 110-3 and PV solar panel 110-4), and, at step 704, storing the energy collected in a first battery bank 102 of a plurality of battery banks. Then, at step 706, in accordance with a series of power harvesting stages, converting the interchangeable power source energy collected and stored in the first battery bank 102 into electrical energy using a plurality of power management devices and a multi-hybrid power generator including a plurality of HEADs. As indicated above, each power management device includes at least one sensor for measuring power at any given time, at least one inverter for changing direct current (DC) to alternative current (AC), and at least one energy router for managing power distribution.

The method 700 further includes, at step 708, driving, under control of at least a second power management device 114-2 in accordance with a first stage of the series of power harvesting stages, a first generator 136, mechanically connected to a first gearbox 132 including a first set of gears 134, for generating and supplying electrical energy to a second battery bank 104 of the plurality of power banks by driving a first HEAD 116-1 of the plurality of HEADs that drives a first piston 120-1 of the plurality of pistons having a first pair of retracting springs 128 connected thereto. The first piston 120-1 is located within a first hydraulic chamber 130-1 and is mechanically connected to a first piston rod 122-1 of the plurality of piston rods to drive a second HEAD 116-2 of the plurality of HEADs and a second piston 120-2 of the plurality of pistons having a second pair of retracting springs connected thereto. The second piston 120-2 is located within a second hydraulic chamber 130-2 and is mechanically connected a second piston rod 122-2 of the plurality of piston rods. The first piston rod 122-1 and the second piston rod 122-2 are mechanically connected to a first crankshaft 124 including a first driving gear 206, a first counterweight 202, and a second counterweight 204 connected thereto. The first driving gear 206 is located at a first center point along the first crankshaft 124 and is mechanically connected to the first set of gears 134 of the first gear box 132 for driving the first set of gears 134 of the first gearbox 132. The first HEAD 116-1 and the second HEAD 116-2 drive the first piston 120-1 and piston rod 122-1 and the second piston 120-2 and piston rod 122-2, respectively, that in turn drive the first crankshaft 124 and the first driving gear 206, which is mechanically connected thereto such that the first driving gear 206 drives the first set of gears 134 of the first gearbox 132 for powering the first generator 136. The first generator 136 is electrically connected to and supplies electrical power to a second battery bank 104 of the plurality of battery banks. The first generator 136 and the second battery bank 104 are electrically connected to a third power management unit 114-3 of the plurality of power management units.

A step 710, driving, under control of the second power management device 114-2 in accordance with a second stage of the series of power harvesting stages, a second generator 142 mechanically connected to a second gearbox 138 including a second set of gears 140, generates and supplies electrical energy to a third battery bank 106 of the plurality of power banks by driving a third HEAD 120-3 of the plurality of HEADs, which drives a third piston 120-3 of the plurality of pistons having a third pair of retracting springs 128 connected thereto. The third piston 120-3 is located within a third hydraulic chamber 130-3 and is mechanically connected to a third piston rod 122-3 of the plurality of piston rods, and drives a fourth HEAD 116-4 of the plurality of HEADs and a fourth piston 120-4 of the plurality of pistons having a fourth pair of retracting springs 128 connected thereto. The fourth piston 120-4 is located within a fourth hydraulic chamber 130-4 and is mechanically connected to a fourth piston rod 122-4 of the plurality of piston rods. The third piston rod 122-3 and the fourth piston rod 122-4 are mechanically connected to a second crankshaft 126 including a second driving gear 206, a third counterweight, and a fourth counterweight connected thereto. The second driving gear 206 is located at a second center point along the second crankshaft 126 and is mechanically connected to the second set of gears 140 of the second gear box 138 for driving the second set of gears 140 of the second gearbox 138. The third HEAD 116-3 and the fourth HEAD 116-4 drive the third piston 120-3 and piston rod 122-3 and the fourth piston 120-4 and piston rod 122-4, respectively, driving the second crankshaft 126 and the second driving gear 206 mechanically connected thereto such that the second driving gear 206 drives the second set of gears 140 of the second gearbox 138 for powering the second generator 142. The second generator 142 is electrically connected to and supplies electrical power to a third battery bank 106 of the plurality of battery banks. As illustrated in FIG. 1 and as discussed hereinbefore, the second generator 142 and the third battery bank 106 are electrically connected to a fourth power management unit 114-4 of the plurality of power management units. The first crankshaft 124 and the second crankshaft 126 are joined by a weighted separator support joint 208 mechanically connected such that the weighted separator support joint 208 separates the first crankshaft 124 and the second crankshaft 126 to allow for independent operation of one from the other.

At step 712, the method further includes selectively controlling, using an intelligent power controller 118 communicatively coupled to at least one electrical load 116 and to the plurality of power management devices, a distribution of the electrical energy generated and supplied by the first generator 136 and the second generator 142, respectively, between or to the at least one electrical load, the plurality of battery banks, and the plurality of HEADs.

In this way, the operations allow for the harvesting, generation, storage, and management of power from an interchangeable power source for distribution in energizing an electrical load and for storing in a plurality of battery banks. Specifically, the intelligent power controller 118 operates the battery bank(s) 102, 104, 106 and HEADs 116 in stages to provide cooling cycles for at least one battery bank and/or at least one HEAD during operation of the remaining battery bank(s) and/or HEAD(s), as depicted in FIG. 8. For example, during the first stage 708, the intelligent power controller 118 controls a first subset of the HEADs (e.g., HEADs 116-1 and 116-2) to power the first generator 136. During a second stage 710, the intelligent power controller 118 controls a second subset of the HEADs (e.g., HEADs 116-3 and 116-4) to power a second generator 142. During a third stage, the intelligent power controller 118 controls both subsets of HEADs (e.g., HEADs 116-1, 116-2, 116-3 and 116-4) in unison to drive the first generator 136 and the second generator 142. During a fourth stage, the intelligent power controller 118 alternates from the first stage to the second stage (alternating between the first subset of HEADs and the second subset of HEADs), from the first stage to the third stage (from the first subset of HEADs to all of the HEADs), and/or from the second stage to the third stage (from the second subset of HEADs to all of the HEADs) to provide efficient energy generation and keep a portion of the multi-hybrid power generator system in a cooling cycle mode. The fourth stage allows a portion of the multi-hybrid power generator system 100 to cool itself off as an alternate portion of the multi-hybrid power generator system 100 works by having a portion of the power generator system 100 to experience intermittent downtime. That is, operating the HEADs in cycles, the non-operational periods provide downtime which allows for cooling of such components, increasing the overall operational efficiency of the system. During the third stage and the fourth stage the multi-hybrid power generator system 100 delivers power on demand and/or to a battery 102, 104, 106. The ability to charge batteries and supply power to an on-demand/active load makes the system 100 efficient enough to perform either in the day or night, with or without solar energy input for a significant amount of time. The system 100 operates with significantly reduced input power during the fourth stage, allowing efficient power generation, storage, and distribution. The intelligent power controller 118 distributes power via on and off cycles based on power storage and power usage capacity and needs.

In some embodiments, the multi-hybrid power generator system 100 operates the first set of gears 134 and the second set of gears 140 synchronously, independently, and/or alternatively. This significantly increases the efficiency, efficacy and durability of the system 100 by avoiding continuous mechanical motion without a resting period like traditional generators.

In an embodiment, each retracting spring 128 is made of a spring material, as hereinbefore disclosed, and is balanced at an operating angle to increase the effect of the piston 120 on the crankshaft 200. The HEADs 116 are supported by the retracting spring 128 and the retracting spring 128 is disposed inside of the piston 120. In one embodiment, the operating angle is approximately 25 degrees (i.e., angled inward with respect to a piston axis, moving from top to bottom). In an embodiment, the operating angle is preferably between 24.618 and 26.973 degrees. The spring material and balancing of the retracting spring 128 increases both the efficiency and the life expectancy of the piston 120. The configuration of the springs 128, and the location of the springs 128 within the pistons 120 or piston chamber 130 increases the efficiency, efficacy, and longevity of the HEAD 116, as well as the system, as a whole. The springs 128 support the upward/downward motion during the retraction and discharging of the HEAD-to-piston cycle and the piston-to-HEAD cycle to and from the original start position.

Importantly, harvested power stored in the first battery bank 102 is utilized to supply the appropriate initial power to the HEADs. The second battery bank 104 and third battery bank 106 can also be utilized to supply power to the both the HEADs and to the load (e.g., load 116) simultaneously as necessary, and can switch back and forth depending on what part of the battery system is calling for it to be charged, and as the controller 118 determines is most optimum to maintain the efficiency of the entire power generation system.

As will be appreciated, during operation of the HEADs, the components of the HEADs increase in temperature due, at least partially, due to friction of the moving parts. When a temperature of a first HEAD set, for example, exceeds a threshold temperature, the controller 118 effects a switch from the first HEAD set to another HEAD set (e.g., a second HEAD set). This deactivation of the first HEAD set allows for the first HEAD set to be cooled until it reaches an optimal operating temperature. Importantly, however, the HEAD system can be operated continuously, alternating between the first HEAD set and the second HEAD set to provide downtime cycles for each HEAD set while the second HEAD set maintains system operation. The cooling ability of the HEADs/HEAD sets allow the stored power (potential) of the HEADs/HEAD sets (hydraulic/electrical systems) to never overheat due to this interchanging/interoperability function.

Importantly, as disclosed above, the HEADs/HEAD sets work together similar to the balance of bicycle peddles on a bicycle with the upward/downward motion. The HEADs/HEAD sets drive mechanical energy via the pistons then to the piston rods toward the crankshaft. The upstroke/downstroke forces created by the HEADs/HEAD sets are supported by the specifically designed springs 128 located inside the pistons for maximum and optimum efficiency, efficacy and longevity. These springs support the upward/downward motion during the retracting/discharging of the HEAD-to-piston cycle (discharge) and piston-to-HEAD cycle (retraction) to and from its original start position.

As disclosed above, an important aspect of the system 100 is the ability for the HEADs/HEAD sets to operate as optimum and efficient as possible via on/off cycle arrangements (cooling cycles) in stages, including a first stage where a first subset of HEADs (e.g. first and second HEADs 116-1, 116-2) are used to power the first set of gears to power the first power generator 136, a second stage where a second subset of HEADs (e.g., third and fourth heads 116-3, 116-4) are used to power the second set of gears to power the second power generator 142, a third stage where the first and second subset of HEADs are operated in unison (synchronously) to drive the mechanical power to both gearboxes to drive both generators 136, 142, and a fourth stage whereby the SIR units work with the intelligent power controller 118 to alternate the stages from the first stage to the second stage, from the first stage to the third stage, and/or the second stage to the third stage to work efficiently while keeping the other portions of the system 100 in a cooling cycle mode (off cycle). The combination of the HEAD, retracting spring, counterweight and gear system, along with the controlled operation in stages, provides an improved efficiency performance ranging between 76% to 85%.

The fourth stage provides for the increased mechanical efficiency of the system by allowing the system to "cool" itself. When portions of the system are operating in the "off cycle" mode, this allows this part of the system to rest, and the part of the system that is working "on cycle" can continue to run efficiently to avoid any potential overheating.

One particular benefit provided by the third stage is the ability of the power generation system 100 to deliver necessary power on demand and/or supply power to batteries for later usage synchronously or alternatively. Due to the electromechanical arrangement of the fourth stage, the power generation and storage efficiency is greatly increased, whereas the demand for the input power (PV panels) decreases. Moreover, operation in the fourth stage or mode of operation, in conjunction the SIR units, allows the power generated to supply the load and charge different battery banks at the same time simultaneously. Due to this effect, the system operates with reduced input power (lower amount of PV panels). Moreover, the ability to charge batteries and supply power to an on-demand/active load 116 renders the present system efficient to the point it can perform either in the day or night with or without solar energy input for a significant amount of time before requiring the solar input (power initiation).

In connection with the above, the SIR units 114-1, 114-2, 114-3, 114-4 in between the three battery banks 102, 104, 106 serves as a monitoring sensor and router that measures the battery banks' ability to store additional power and/or route the power for consumption or storage. Another major function of the SIR unit between battery banks is to allow the alternating battery bank to accept power to charge its respective bank with its unit power generator or the other unit generator thereby increasing total system efficiency. The SIR units also serve as the main signal detection point of incoming power generation and routing of said power throughout the entire power generation system.

In further embodiments, there may be an initial powering, using the interchangeable power source energy stored in the first battery bank of the plurality of battery banks, in accordance the first stage and the second stage of the series of power harvesting stages, as detailed above. Further, there may be an additional step of distributing, under control of the intelligent power controller, the electrical energy generated and supplied by the first generator and the second generator, respectively, for storing in the second battery bank and the third battery bank and energizing the at least one electrical load. In addition, there may be a step 714 of driving, in a third stage of the series of power harvesting stages, mechanical power to the first crankshaft and the second crankshaft, the first stage and the second stage of the power harvesting stages are operating synchronously during the third stage of the series of power harvesting stages. Further, there may be a step 716 of alternating, in a fourth stage of the series of power harvesting stages, between any two of the four power harvesting stages. Alternating between cycles having three (3) battery banks specifically allows the system 100 to operate smoothly and to allow cooling cycles without impeding operation of the system 100.

Figure 9:
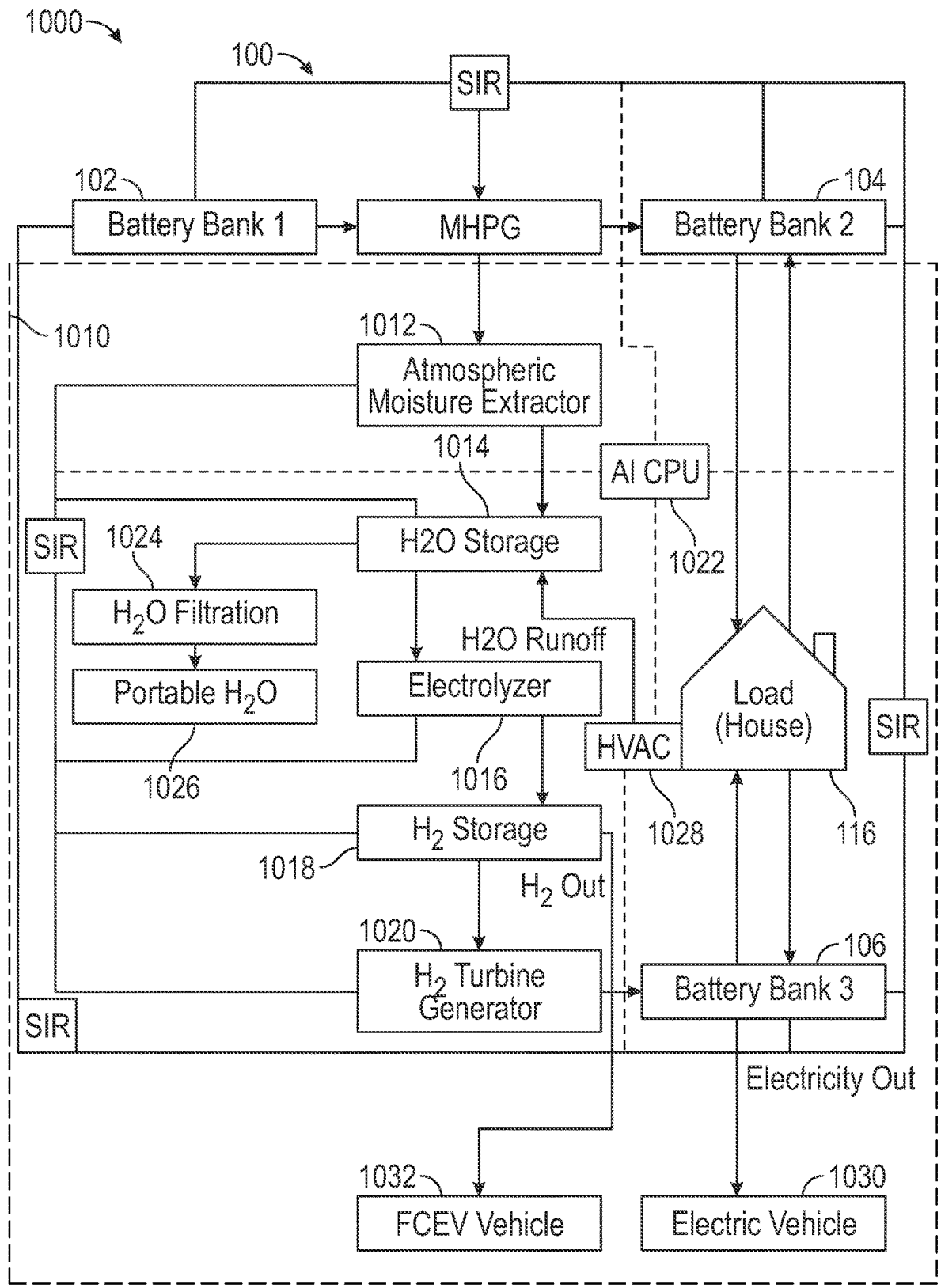
FIG. 9 presents a schematic of a hydraulic-to-hydrogen-to-electric power generation system according to another embodiment of the invention.

In an embodiment, in addition to providing for the generation of electric power in the manner described above for meeting an electrical demand or load, the multi-hybrid power generation system 100 hereinbefore described can also be utilized to supply dedicated, efficient, and sustainable electrical power for use in hydrogen extraction and power generation processes. FIG. 9 illustrates a power generation and storage system 1000 that includes multi-hybrid power generation system 100 and a linked hydraulic-to-hydrogen-to-electric power generation system 1010 (also referred to as multi-hybrid hydroxygen power generation system 1010) that may utilize storage system 100 as a power source for performing hydrogen extraction and power generation processes, in accordance with an embodiment of the invention.

The hydraulic-to-hydrogen-to-electric power generation system 1010 is configured to extract hydrogen from the atmosphere for storage and/or use in electric power production. In an embodiment, the system 1010 includes an atmospheric moisture extraction device 1012 that is configured to extract moisture (i.e., water) from ambient air surrounding the subsystem 1010, a first storage device such as a tank 1014 configured to store the extracted moisture/water, a hydrogen electrolyzer 1016 that receives the moisture and produces hydrogen via a chemical process such as electrolysis, a second storage device such as a high pressure tank 1018 that is configured to store the hydrogen produced by the electrolyzer 1016, a turbine generator system 1020 that uses the hydrogen produced as a fuel source to generate electrical power, and a controller 1022. While FIG. 9 illustrates a dedicated controller 1022 for system 1010, it is contemplated that a single, master controller, such as controller 118 may be utilized to control operation of both systems 100, 1010, without departing from the broader aspects of the invention. In either implementation, the controller 1022 (or controller 118, as the case may be)is configured to control the storage of the water in the first tank 1014 and the hydrogen in the second tank 1018, and to control the supply of hydrogen to the generator system 1020 for future and/or on demand usage, as described in detail hereinafter. As indicated above, the system 1000 also includes a supply of electrical power for use by the subsystem 1010. As illustrated in FIG. 9, in an embodiment, the supply of electrical power may be provided by the multi-hybrid power generator system 100, although other sources of electrical power may also be employed.

In an embodiment, the atmospheric moisture extraction device 1012 may be any type of moisture extraction device or atmospheric water generator known in the art, such as, for example, condensation, hydroscopy, wet desiccant, solid desiccant, or other systems, or combinations of the above. In an embodiment, the electrolyzer 1016 may be any type of system or device known in the art that utilizes electricity to split water into hydrogen and oxygen via electrolysis. For example, the electrolyzer 1016 may be a polymer electrolyte membrane electrolyzer, an alkaline electrolyzer or a solid oxide electrolyzer, although the invention is not intended to be so limited in this regard. In an embodiment, the turbine generator system 1020 may be any type of hydrogen-fueled gas turbine known in the art.

The power generation and storage system 1000 of the present invention is thus operable in an atmospheric moisture extraction-electrolysis (AMEE) mode as needed to extract water from the atmosphere using the moisture extraction device 1012, under power from the connected multi-hybrid power generation system 100 and/or the power stored in one or more of the battery banks 102, 104, 106. In one embodiment, the primary power input/source to the multi-hybrid power generation system 100 may be solar energy. In this case, via the artificial intelligence controlled central processing unit 1022, the system 1010 can automatically switch from solar mode (daytime) to night mode (solar off cycle) and choose to extract moisture from the air as a fuel source or draw stored water and additionally draw water from an HVAC system (if available) and is interchangeable/programmable as needed.

With further reference to FIG. 9, it is contemplated that the water extracted from the air by the atmospheric moisture extraction device 1012 and stored in storage device 1014 may be utilized in a variety of ways. For example, the extracted water may be stored in storage tank 1014 for later use as a fuel source (e.g., provided to the electrolyzer 1016 for use in the production of hydrogen). The water may also be stored in storage tank 1014 and filtered, e.g., by filtration system 1024, to produce potable water 1026. Additionally, the extracted water may be stored for use in a variety of applications conducive to a user such as, for example, fire suppression systems, irrigation, etc. Other end uses are also envisioned. In an embodiment, the water storage device 1014 may be fluidly connected to a HVAC system 1028 of a building such as a house 1030 or other structure. In an embodiment, the storage device 1014 receives runoff (condensation) from the HVAC system 1028, to be stored and later used for the various purposes described above. In this manner, the storage tank 1014 may be replenished even when the extractor 1012 is not being used.

Importantly, the downstream use of the water stored in storage device 1014 can be controlled by the controller 1022 according to an algorithm stored in memory. For example, in an embodiment, the controller 1022 is configured to prioritize the use of the water stored in storage device 1014 based on the needs of the recipients/applications (e.g., based on the various demands on the system 1010). In one embodiment, the controller 1022 may prioritize use of the water to produce hydrogen (i.e., using electrolyzer 1016) over usage as drinking/potable water 1026, irrigation, etc. In an embodiment, this may be a programmable function, and this hierarchical control may be configured and be performed manually or automatically. In an embodiment, the controller 1022 utilizes artificial intelligence to switch between the generating electricity using the system 100, operating the extraction device 1014 to produce water, operating the electrolyzer 1016 to produce hydrogen, and/or operating the hydrogen turbine generator system 1020 to produce electricity for use and/or storage.

As indicated above, in a hydrogen production mode of operation, the extracted water (either directly from extractor 1020, or from storage tank 1014) is processed via an electrolysis styled mechanism (hydrogen electrolyzer 1016) or any mechanism that uses electricity split up the hydrogen and oxygen molecules. A post-electrolysis process algorithm allows the useable fuels of hydrogen to be stored, for future usage, in storage device 1018. The stored hydrogen can then be used as a source of fuel in the turbine-generator system to mechanically rotate/power the electrical generator of the system 1020 to generate electrical power. The electricity produced may then be stored in one of the battery banks, such as battery bank 106, and used to meet an electrical load. In an embodiment, the battery bank 106 may be electrically connected to a building such as a house 116 in order to meet the electricity demands thereof, and/or selectively connected to an electric vehicle 1030 for charging the vehicle 1030. In an embodiment, the electricity produced may be fed into the electric grid, either through a direct connection between the grid and the generator system 1020, or via a connection between the battery bank 106 and the grid. The Hydrogen Electrical Generator (HEG) 1020 yields higher amounts of electricity with or without solar power for extended periods of time by relaying power storage between batteries and hydrogen storage. This "double storage" system allows the power storage redundancy cycles to work efficiently for longer periods of time without the initial power input, i.e. solar, wind etc.

In addition to using hydrogen from storage tank 1018 as a fuel in the turbine generator system 1020, the hydrogen from storage tank 1018 may alternatively, or additionally, be used to fill the hydrogen fuel tank of a fuel cell electric vehicle 1032. As will be appreciated, by storing the hydrogen produced in storage tank 1018, it is thus available on demand to produce electricity via the turbine generator system 1020, or for use as a fuel in vehicle 1032.

A major advantage of the system 1000 is that it allows multiple power inputs, multiple power storages and multiple AI programmable options which directly supports the "cooling" of the system, which is unique for any hydraulic system using high pressure input, which thereby increases operational efficiency and longevity of the entire system 1000. In particular, the system 1000 can be programmed to function in 'hydrogen mode', generating electrical power from the stored hydrogen in tank 1018 rather than from the MHPG system 100 directly, which provides for additional cooling off cycle time for the MHPG system 100. Accordingly, the system 1000 can provide for constant or near-constant generation of electrical power, cycling between power generation from MPHG system 100, and/or from turbine generator system 1020 using stored hydrogen as fuel, under control of controller 1022 and/or controller 118.

In an embodiment, the system 1010 allows for the ability to set the hydrogen capacity when the system 1010 is not in use. In some embodiments, the system 1010 and/or the controller 1022 is programmable to aid in additional cooling off-cycle time for the system 100. When the system 1010 is operating, the system 100 may revert to a prolonged cooling cycle that increases hydrogen reserves and/or the efficiency of the system 100. In some embodiments, this prolonged cooling cycle is programmed for a desired storage of moisture and/or capacity of hydrogen (e.g., 1 gallon, 5 gallons, 10 gallons etc.).

The system 1000 of the present invention has the ability to store potential energy in one of the two forms, namely, batteries and hydrogen. In particular, electricity generated by system 100 or system 1010 can be stored in any of the battery banks 102, 104, 106 for later use or distribution. In addition, the hydrogen produced/extracted using electrolyzer 1016 also serves as a form of potential energy, as it can be used as desired in the production of electricity using turbine generator system 1020. Moreover, a third storage system is the potential-kinetic power in the hydraulics used in the HEAD devices of MPHG system 100. Such triple storage system significantly increases the efficiency of the MHPG and MHHPG power generation systems 100, 1010, and system 1000, as a whole, from multiple inputs (e.g., solar, wind, geothermal etc.) to hydraulics to electricity (MHPG) and hydraulics-to-hydrogen-to-electricity (MHHPG). In particular, the power generation and storage system 1000 of the invention provides three different mechanism for power generation/storage, namely, using HEADs 116-1, 116-2, 116-3, 116-4 and generators 136, 142, battery banks 102, 104, 106, and hydrogen. This increases the overall efficiency, efficacy and longevity of the system 1000.

In connection with the above, the required input voltage needed for the atmospheric moisture extraction-electrolysis cycle using extractor 1012 and electrolyzer 1016 is relatively low compared to the power produced from the first system 100 (MHPG). This significantly increases the efficiency and longevity of both the MHPG and MHHPG systems 100, 1010 as it provides for multiple means of generating and storing power without specifically using the HEADs in the MPHG system 100 or solely hydrogen gas in the MHHPG system 1010. This allows for an increased or prolonged cooling/rest cycle to be employed, which improves overall efficiency of the system 1000. In an embodiment, the input voltage request for the atmospheric moisture extraction-electrolysis cycle using extractor 1012 and electrolyzer 1016 is so low that this cycle can be run very efficiently (24 hours a day, 7 days a week) without depleting the battery banks 102, 104, 106, due to the charging of the battery banks from the HEADs of the MPHG system 100. That is, any depletion of the electricity stored in the battery banks 102, 104, 106 is easily replenished via operation of the MPHG system 100 and its HEADs, even given fluctuations in input energy (e.g., solar, wind, etc.).

The power generation and storage system 1000 of the invention therefore provides the ability to generate, store and distribute both electricity and/or hydrogen as desired, under control of the controller(s), and in dependence upon consumer needs, system status, efficiency considerations, or ambient conditions (wind speed, time of day, etc.). In addition to supplying structures, the grid or other applications with a reliable source of electric power, the system 1000 also provides the ability to charge electric vehicles (EV) or fuel cell electric vehicles (FCEV) in the manner disclosed above.

With specific respect to the production and utilization of hydrogen, as a comparison, the industry benchmark for highly efficient electrolyzers is 50 kWh/kg. The power generation system-electrolyzer of the system 1010 operates at more than 85% system efficiency due to the redundant supplemental electrical power available and/or stored power for usage in the electrolysis stage/power production. In connection with the above, a hydrogen electrolyzer that consumes 50 kWh of electricity to produce one kilogram of hydrogen has an efficiency of 39.4 kWh/kg divided by 50 kWh/kg, which is approximately 79% system efficiency. The MHPG-MHHPG system 1000 of the present invention is much more efficient than this, however, due to the enormous supply of the reliable and steady input power from the MHPG system 100. With current technologies, electrolysis generally produces hydrogen at about 75 percent efficiency. Accordingly, to create a kilogram of pure hydrogen fuel, which holds about 39.4 kWh of energy, it takes 52.5 kWh. By improving electrolysis efficiency to 95%, however, which is possible by utilizing the power supplied by system 100 in system 1010, it only requires 41.5 kWh to generate a kilogram of hydrogen fuel.

In some embodiments the method or methods described above may be executed or carried out by a computing system including a tangible computer-readable storage medium, also described herein as a storage machine, that holds machine-readable instructions executable by a logic machine (i.e., a processor or programmable control device) to provide, implement, perform, and/or enact the above-described methods, processes, and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

In an embodiment a multi-hybrid power generation system includes at least one battery configured to receive and store energy from a power source, a first device in electrical communication with the at least one battery, the first device being configured to convert electrical energy from the at least one battery into mechanical energy, a first generator operatively connected to the first device, the first generator being configured to convert the mechanical energy produced by the first device into electrical energy, a first energy storage device configured to store the electrical energy produced by the first generator, and a controller configured to control energy monitoring, energy generation, energy distribution and energy storage between the at least one battery, the first device, the first energy storage device and an electrical load. In an embodiment, the multi-hybrid power generation system further includes a second device configured to produce mechanical energy, and a second generator operatively connected to the second generator, the second generator being configured to convert mechanical energy produced by the second device into electrical energy. In an embodiment, the second device is in electrical communication with the at least one battery, and is configured to convert electrical energy from the at least one battery into mechanical energy. In an embodiment, during a first stage of operation, the controller controls the first device to power the first generator, wherein during a second stage of operation, the controller controls the first device to power the second generator, wherein during a third stage of operation, the controller controls both the first device and the second device in unison to power the first generator and the second generator, and wherein during a fourth stage of operation, the controller alternates from the first stage of operation to the second stage of operation, from the first stage of operation to the third stage of operation, and/or from the second stage of operation to the third stage of operation to provide efficient energy generation and to maintain a portion of the multi-hybrid power generation system in a cooling mode. In an embodiment, the first device is a hydraulic electrical actuation device (HEAD), the hydraulic electrical actuation device having a piston disposed within a hydraulic chamber, a piston rod connected to the piston, wherein the piston rod is operatively connected to a crankshaft that is operatively connected to the first generator. In an embodiment, the hydraulic electrical actuation device includes a retracting spring that assists movement of the piston within the hydraulic chamber. In an embodiment, the controller is configured to operate the system in a first mode of operation whereby the first device powers the first generator while the second device is static to effect cooling of the second device, and in a second mode of operation whereby the second device power the second generator, while the first device is static to effect cooling of the first device. In an embodiment, the controller is configured to alternate between the first mode of operation and the second mode of operation in dependence upon a temperature of at least one of the first device and the second device. In an embodiment the system further includes a secondary power generation system configured to utilize the electrical energy to extract water from ambient air and to produce hydrogen from the extracted water via electrolysis. In an embodiment, the secondary power generation system includes an extraction device configured to extract the water from the ambient air, a first tank configured to store the water, an electrolyzer configured to receive the water and produce hydrogen via electrolysis, a second tank configured to store the hydrogen produced by the electrolyzer, and a generator system configured to generate electrical power from hydrogen.

In another embodiment of the invention, a power generation system includes an extraction device configured to extract moisture from an ambient air surrounding the system, a first tank configured to store the moisture, an electrolyzer configured to receive the moisture and produce hydrogen by performing a chemical process, a second tank configured to store the hydrogen produced by the electrolyzer, a generator system configured to generate electrical power from the hydrogen, and a controller configured to control operation of the extraction device and the electrolyzer. In an embodiment, the system further includes a primary power source configured to supply to power the extraction device and/or the electrolyzer, wherein the controller utilizes artificial intelligence to switch between the primary power input and at least one of the extraction device, electrolyzer, and generator system. In an embodiment, the moisture is water and the power generation system further includes a filtration system to filter the water to produce potable water. In an embodiment, the first tank is fluidly connected to an HVAC system of a building and is configured to receive condensation from the HVAC system. In an embodiment, the system further include at least one battery configured to store electrical power generated by the generator system, wherein the at least one battery is configured to supply an energy demand of a building and to charge an electric vehicle. In an embodiment, the controller is configured to control the storage of moisture in the first tank and hydrogen in the second tank, and to control supply of the hydrogen to the generator for future and/or on demand usage. In an embodiment, the controller is configured to switch between the primary power input and at least one of the extraction device, electrolyzer, and generator system.

In yet another embodiment, a multi-hybrid power generation system includes a primary power input configured to generate electricity, an extraction device configured to extract moisture, a first tank configured to store the moisture, an electrolyzer configured to receive the moisture and produce hydrogen, a second tank configured to store the hydrogen produced by the electrolyzer, a generator system configured to generate electrical power from hydrogen, and a controller configured to control the storage of the moisture in the first tank and the second tank and to provide the hydrogen to the generator, wherein the controller is configured to switch between the primary power input and at least one of the extraction device, electrolyzer, and generator system. In an embodiment, the moisture is water, and the multi-hybrid power generation system further comprises a first subsystem configured for storage of the received water for future use as a fuel source, a second subsystem configured for filtering the received water into the potable water and storing the potable water for future use, a third subsystem configured for storage of the received water for other uses, and a fourth subsystem configured to recycle a runoff water from an air conditioning system. In an embodiment, the primary power input includes at least one hydraulic electrical actuation device (HEAD) configured to drive a generator to produce the electricity used by the extraction device and the electrolyzer.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A multi-hybrid power generation system comprising:
   at least one battery configured to receive and store energy from a power source;
   a first device in electrical communication with the at least one battery, the first device being configured to convert electrical energy from the at least one battery into mechanical energy;
   a first generator operatively connected to the first device, the first generator being configured to convert the mechanical energy produced by the first device into electrical energy;
   a first energy storage device configured to store the electrical energy produced by the first generator; and
   a controller configured to control energy monitoring, energy generation, energy distribution and energy storage between the at least one battery, the first device, the first energy storage device and an electrical load.

2. The multi-hybrid power generation system of claim 1, further comprising:
   a second device configured to produce mechanical energy; and
   a second generator operatively connected to the second generator, the second generator being configured to convert mechanical energy produced by the second device into electrical energy.

3. The multi-hybrid power generation system of claim 2, wherein:
   the second device is in electrical communication with the at least one battery, and is configured to convert electrical energy from the at least one battery into mechanical energy.

4. The multi-hybrid power generation system of claim 3, wherein:
   during a first stage of operation, the controller controls the first device to power the first generator,
   wherein during a second stage of operation, the controller controls the first device to power the second generator,
   wherein during a third stage of operation, the controller controls both the first device and the second device in unison to power the first generator and the second generator; and
   wherein during a fourth stage of operation, the controller alternates from the first stage of operation to the second stage of operation, from the first stage of operation to the third stage of operation, and/or from the second stage of operation to the third stage of operation to provide efficient energy generation and to maintain a portion of the multi-hybrid power generation system in a cooling mode.

5. The multi-hybrid power generation system of claim 1, wherein:
   the first device is a hydraulic electrical actuation device (HEAD), the hydraulic electrical actuation device having a piston disposed within a hydraulic chamber, a piston rod connected to the piston;
   wherein the piston rod is operatively connected to a crankshaft that is operatively connected to the first generator.

6. The multi-hybrid power generation system of claim 5, wherein:

the hydraulic electrical actuation device includes a retracting spring that assists movement of the piston within the hydraulic chamber.

7. The multi-hybrid power generation system of claim 2, wherein:
the controller is configured to operate the system in a first mode of operation whereby the first device powers the first generator while the second device is static to effect cooling of the second device, and in a second mode of operation whereby the second device power the second generator, while the first device is static to effect cooling of the first device.

8. The multi-hybrid power generation system of claim 7, wherein:
the controller is configured to alternate between the first mode of operation and the second mode of operation in dependence upon a temperature of at least one of the first device and the second device.

9. The multi-hybrid power generation system of 1, further comprising:
a secondary power generation system configured to utilize the electrical energy to extract water from ambient air and to produce hydrogen from the extracted water via electrolysis.

10. The multi-hybrid power generation system of claim 9, wherein:
the secondary power generation system includes:
an extraction device configured to extract the water from the ambient air;
a first tank configured to store the water;
an electrolyzer configured to receive the water and produce hydrogen via electrolysis;
a second tank configured to store the hydrogen produced by the electrolyzer; and
a generator system configured to generate electrical power from hydrogen.

11. A power generation system, comprising:
an extraction device configured to extract moisture from an ambient air surrounding the system;
a first tank configured to store the moisture;
an electrolyzer configured to receive the moisture and produce hydrogen by performing a chemical process;
a second tank configured to store the hydrogen produced by the electrolyzer;
a generator system configured to generate electrical power from the hydrogen; and
a controller configured to control operation of the extraction device and the electrolyzer.

12. The power generation system of claim 11, further comprising:
a primary power source configured to supply to power the extraction device and/or the electrolyzer;
wherein the controller utilizes artificial intelligence to switch between the primary power input and at least one of the extraction device, electrolyzer, and generator system.

13. The power generation system of claim 11, wherein:
the moisture is water and the power generation system further includes a filtration system to filter the water to produce potable water.

14. The power generation system of claim 13, wherein:
the first tank is fluidly connected to an HVAC system of a building and is configured to receive condensation from the HVAC system.

15. The power generation system of claim 11, further comprising:
at least one battery configured to store electrical power generated by the generator system; and
wherein the at least one battery is configured to supply an energy demand of a building and to charge an electric vehicle.

16. The power generation system of claim 11, wherein:
the controller is configured to control the storage of moisture in the first tank and hydrogen in the second tank, and to control supply of the hydrogen to the generator for future and/or on demand usage.

17. The power generation system of claim 16, wherein:
the controller is configured to switch between the primary power input and at least one of the extraction device, electrolyzer, and generator system.

18. A multi-hybrid power generation system, comprising:
a primary power input configured to generate electricity,
an extraction device configured to extract moisture;
a first tank configured to store the moisture;
an electrolyzer configured to receive the moisture and produce hydrogen;
a second tank configured to store the hydrogen produced by the electrolyzer;
a generator system configured to generate electrical power from hydrogen; and
a controller configured to control the storage of the moisture in the first tank and the second tank and to provide the hydrogen to the generator,
wherein the controller is configured to switch between the primary power input and at least one of the extraction device, electrolyzer, and generator system.

19. The multi-hybrid power generation system of claim 18, wherein:
the moisture is water, and
wherein the multi-hybrid power generation system further comprises a first subsystem configured for storage of the received water for future use as a fuel source, a second subsystem configured for filtering the received water into the potable water and storing the potable water for future use, a third subsystem configured for storage of the received water for other uses, and a fourth subsystem configured to recycle a runoff water from an air conditioning system.

20. The multi-hybrid power generation system of claim 18, wherein:
the primary power input includes at least one hydraulic electrical actuation device (HEAD) configured to drive a generator to produce the electricity used by the extraction device and the electrolyzer.

* * * * *